(12) United States Patent
Barde et al.

(10) Patent No.: US 9,189,605 B2
(45) Date of Patent: Nov. 17, 2015

(54) PROTECTED COMPUTING ENVIRONMENT

(75) Inventors: Sumedh N. Barde, Redmond, WA (US); Jonathan D. Schwartz, Kirkland, WA (US); Reid Joseph Kuhn, Seattle, WA (US); Alexandre Vicktorovich Grigorovitch, Redmond, WA (US); Kirt A. Debique, Seattle, WA (US); Chadd B. Knowlton, Bellevue, WA (US); James M. Alkove, Woodinville, WA (US); Geoffrey T. Dunbar, Kirkland, WA (US); Michael J. Grier, Woodinville, WA (US); Ming Ma, Bellevue, WA (US); Chaitanya D. Upadhyay, Kirkland, WA (US); Adil Ahmed Sherwani, Seattle, WA (US); Arun Upadhyaya Kishan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 12/390,505

(22) Filed: Feb. 23, 2009

(65) Prior Publication Data

US 2009/0158036 A1 Jun. 18, 2009

Related U.S. Application Data

(62) Division of application No. 11/116,598, filed on Apr. 27, 2005.

(60) Provisional application No. 60/673,979, filed on Apr. 22, 2005.

(51) Int. Cl.
*G06F 21/00* (2006.01)
*G06F 21/10* (2013.01)
(Continued)

(52) U.S. Cl.
CPC ............... *G06F 21/10* (2013.01); *G06F 21/57* (2013.01); *H04L 9/3247* (2013.01); *H04L 9/3263* (2013.01); *G06F 2221/0735* (2013.01); *H04L 2209/603* (2013.01)

(58) Field of Classification Search
USPC ........................................................ 713/164
See application file for complete search history.

(56) References Cited

U.S. PATENT DOCUMENTS 3,718,906 A 2/1973 Lightner
4,183,085 A 1/1980 Roberts
(Continued)

FOREIGN PATENT DOCUMENTS

CN 1287665 3/2001
CN 1305159 7/2001
(Continued)

OTHER PUBLICATIONS

Patent Cooperation Treaty "PCT International Search Report" for International Application No. PCT/USO5/30490, Date of mailing of the international search report Sep. 18, 2007, Authorized Officer Jacqueline A. Whitfield.(The corresponding document was previously submitted in connection with parent U.S. Appl. No. 11/116,598 and is not being resubmitted herewith per 37 CFR 1.98(d).).

(Continued)

*Primary Examiner* — Jeffrey D Popham
(74) *Attorney, Agent, or Firm* — Kate Drakos; Henry Gabryjelski; Micky Minhas

(57) ABSTRACT

A method of establishing a protected environment within a computing device including validating a kernel component loaded into a kernel of the computing device, establishing a security state for the kernel based on the validation, creating a secure process and loading a software component into the secure process, periodically checking the security state of the kernel, and notifying the secure process when the security state of the kernel has changed.

10 Claims, 14 Drawing Sheets

(51) Int. Cl.
*G06F 21/57* (2013.01)
*H04L 9/32* (2006.01)

(56) References Cited

U.S. PATENT DOCUMENTS

| | | |
|---|---|---|
| 4,323,921 A | 4/1982 | Guillou |
| 4,405,829 A | 9/1983 | Rivest |
| 4,528,643 A | 7/1985 | Freeny |
| 4,558,176 A | 12/1985 | Arnold et al. |
| 4,620,150 A | 10/1986 | Germer et al. |
| 4,658,093 A | 4/1987 | Hellman |
| 4,683,553 A | 7/1987 | Mollier |
| 4,750,034 A | 6/1988 | Lem |
| 4,817,094 A | 3/1989 | Lebizay et al. |
| 4,827,508 A | 5/1989 | Shear |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |
| 4,916,738 A | 4/1990 | Chandra |
| 4,953,209 A | 8/1990 | Ryder |
| 4,959,774 A | 9/1990 | Davis |
| 4,967,273 A | 10/1990 | Greenberg |
| 4,977,594 A | 12/1990 | Shear |
| 5,001,752 A | 3/1991 | Fischer |
| 5,012,514 A | 4/1991 | Renton |
| 5,050,213 A | 9/1991 | Shear |
| 5,103,392 A | 4/1992 | Mori |
| 5,103,476 A | 4/1992 | Waite |
| 5,109,413 A | 4/1992 | Comerford |
| 5,117,457 A | 5/1992 | Comerford |
| 5,193,573 A | 3/1993 | Chronister |
| 5,222,134 A | 6/1993 | Waite |
| 5,249,184 A | 9/1993 | Woest et al. |
| 5,269,019 A | 12/1993 | Peterson et al. |
| 5,274,368 A | 12/1993 | Breeden et al. |
| 5,295,266 A | 3/1994 | Hinsley |
| 5,301,268 A | 4/1994 | Takeda |
| 5,303,370 A | 4/1994 | Brosh |
| 5,319,705 A | 6/1994 | Halter |
| 5,355,161 A | 10/1994 | Bird et al. |
| 5,369,262 A | 11/1994 | Dvorkis et al. |
| 5,373,561 A | 12/1994 | Haber |
| 5,406,630 A | 4/1995 | Piosenka et al. |
| 5,410,598 A | 4/1995 | Shear |
| 5,414,861 A | 5/1995 | Horning |
| 5,437,040 A | 7/1995 | Campbell |
| 5,442,704 A | 8/1995 | Holtey |
| 5,448,045 A | 9/1995 | Clark |
| 5,457,699 A | 10/1995 | Bode |
| 5,459,867 A | 10/1995 | Adams et al. |
| 5,473,692 A | 12/1995 | Davis |
| 5,490,216 A | 2/1996 | Richardson, III |
| 5,500,897 A | 3/1996 | Hartman, Jr. |
| 5,509,070 A | 4/1996 | Schull |
| 5,513,319 A | 4/1996 | Finch et al. |
| 5,522,040 A | 5/1996 | Hofsass et al. |
| 5,530,846 A | 6/1996 | Strong |
| 5,552,776 A | 9/1996 | Wade et al. |
| 5,563,799 A | 10/1996 | Brehmer et al. |
| 5,568,552 A | 10/1996 | Davis |
| 5,586,291 A | 12/1996 | Lasker et al. |
| 5,615,268 A | 3/1997 | Bisbee |
| 5,629,980 A | 5/1997 | Stefik |
| 5,634,012 A | 5/1997 | Stefik |
| 5,636,292 A | 6/1997 | Rhoads |
| 5,638,443 A | 6/1997 | Stefik |
| 5,638,513 A | 6/1997 | Ananda |
| 5,644,364 A | 7/1997 | Kurtze |
| 5,671,412 A | 9/1997 | Christiano |
| 5,673,316 A | 9/1997 | Auerbach |
| 5,710,706 A | 1/1998 | Markl et al. |
| 5,710,887 A | 1/1998 | Chelliah |
| 5,715,403 A | 2/1998 | Stefik |
| 5,717,926 A | 2/1998 | Browning |
| 5,721,788 A | 2/1998 | Powell |
| 5,724,425 A | 3/1998 | Chang et al. |
| 5,745,879 A | 4/1998 | Wyman |
| 5,754,763 A | 5/1998 | Bereiter |
| 5,758,068 A | 5/1998 | Brandt et al. |
| 5,763,832 A | 6/1998 | Anselm |
| 5,765,152 A | 6/1998 | Erickson |
| 5,768,382 A | 6/1998 | Schneier et al. |
| 5,771,354 A | 6/1998 | Crawford |
| 5,774,870 A | 6/1998 | Storey |
| 5,793,839 A | 8/1998 | Farris et al. |
| 5,799,088 A | 8/1998 | Raike |
| 5,802,592 A | 9/1998 | Chess |
| 5,809,144 A | 9/1998 | Sirbu |
| 5,809,145 A | 9/1998 | Slik |
| 5,812,930 A | 9/1998 | Zavrel |
| 5,825,877 A | 10/1998 | Dan |
| 5,825,879 A | 10/1998 | Davis |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,845,281 A | 12/1998 | Benson |
| 5,875,236 A | 2/1999 | Jankowitz et al. |
| 5,883,670 A | 3/1999 | Sporer et al. |
| 5,883,955 A | 3/1999 | Ronning |
| 5,892,900 A | 4/1999 | Ginter |
| 5,892,906 A | 4/1999 | Chou et al. |
| 5,913,038 A | 6/1999 | Griffiths |
| 5,925,127 A | 7/1999 | Ahmad |
| 5,926,624 A | 7/1999 | Katz |
| 5,935,248 A | 8/1999 | Kuroda |
| 5,943,248 A | 8/1999 | Clapp |
| 5,948,061 A | 9/1999 | Merriman |
| 5,949,879 A | 9/1999 | Berson |
| 5,953,502 A | 9/1999 | Helbig et al. |
| 5,956,408 A | 9/1999 | Arnold |
| 5,983,238 A | 11/1999 | Becker et al. |
| 5,983,350 A | 11/1999 | Minear |
| 5,994,710 A | 11/1999 | Knee et al. |
| 6,021,438 A | 2/2000 | Duvvoori |
| 6,026,293 A | 2/2000 | Osborn |
| 6,049,789 A | 4/2000 | Frison et al. |
| 6,058,476 A | 5/2000 | Matsuzaki |
| 6,061,451 A | 5/2000 | Muratani |
| 6,061,794 A | 5/2000 | Angelo et al. |
| 6,069,647 A | 5/2000 | Sullivan |
| 6,078,909 A | 6/2000 | Knutson |
| 6,101,606 A | 8/2000 | Diersch et al. |
| 6,119,229 A | 9/2000 | Martinez et al. |
| 6,128,740 A | 10/2000 | Curry |
| 6,134,659 A | 10/2000 | Sprong |
| 6,147,773 A | 11/2000 | Taylor |
| 6,148,417 A | 11/2000 | Da Silva |
| 6,157,721 A | 12/2000 | Shear |
| 6,158,011 A | 12/2000 | Chen |
| 6,158,657 A | 12/2000 | Hall, III et al. |
| 6,170,060 B1 | 1/2001 | Mott |
| 6,185,678 B1 | 2/2001 | Arbaugh et al. |
| 6,188,995 B1 | 2/2001 | Garst et al. |
| 6,189,146 B1 | 2/2001 | Misra et al. |
| 6,192,392 B1 | 2/2001 | Ginter |
| 6,209,099 B1 | 3/2001 | Saunders |
| 6,219,652 B1 | 4/2001 | Carter et al. |
| 6,219,788 B1 | 4/2001 | Flavin |
| 6,223,291 B1 | 4/2001 | Puhl |
| 6,226,618 B1 | 5/2001 | Downs |
| 6,226,747 B1 | 5/2001 | Larsson et al. |
| 6,230,185 B1 | 5/2001 | Salas et al. |
| 6,230,272 B1 | 5/2001 | Lockhart |
| 6,233,600 B1 | 5/2001 | Salas et al. |
| 6,233,685 B1 | 5/2001 | Smith |
| 6,243,439 B1 | 6/2001 | Arai et al. |
| 6,253,224 B1 | 6/2001 | Brice, Jr. et al. |
| 6,263,431 B1 | 7/2001 | Lovelace et al. |
| 6,266,420 B1 | 7/2001 | Langford |
| 6,266,480 B1 | 7/2001 | Ezaki |
| 6,272,469 B1 | 8/2001 | Koritzinsky et al. |
| 6,279,111 B1 | 8/2001 | Jensenworth et al. |

(56) References Cited

U.S. PATENT DOCUMENTS

| | | | |
|---|---|---|---|
| 6,279,156 | B1 | 8/2001 | Amberg et al. |
| 6,286,051 | B1 | 9/2001 | Becker et al. |
| 6,289,319 | B1 | 9/2001 | Lockwood et al. |
| 6,295,577 | B1 | 9/2001 | Anderson et al. |
| 6,298,446 | B1 | 10/2001 | Schreiber |
| 6,303,924 | B1 | 10/2001 | Adan et al. |
| 6,314,408 | B1 | 11/2001 | Salas et al. |
| 6,314,409 | B2 | 11/2001 | Schneck et al. |
| 6,321,335 | B1 | 11/2001 | Chu |
| 6,327,652 | B1 | 12/2001 | England |
| 6,330,670 | B1 | 12/2001 | England et al. |
| 6,334,189 | B1 | 12/2001 | Granger |
| 6,345,294 | B1 | 2/2002 | O'Toole et al. |
| 6,363,488 | B1 | 3/2002 | Ginter |
| 6,367,017 | B1 | 4/2002 | Gray |
| 6,373,047 | B1 | 4/2002 | Adan et al. |
| 6,374,355 | B1 | 4/2002 | Patel |
| 6,385,727 | B1 | 5/2002 | Cassagnol et al. |
| 6,405,923 | B1 | 6/2002 | Seyson |
| 6,408,170 | B1 | 6/2002 | Schmidt et al. |
| 6,409,089 | B1 | 6/2002 | Eskicioglu |
| 6,411,941 | B1 | 6/2002 | Mullor et al. |
| 6,424,714 | B1 | 7/2002 | Wasilewski et al. |
| 6,425,081 | B1 | 7/2002 | Iwamura |
| 6,441,813 | B1 | 8/2002 | Ishibashi |
| 6,442,529 | B1 | 8/2002 | Krishan et al. |
| 6,442,690 | B1 | 8/2002 | Howard |
| 6,449,598 | B1 | 9/2002 | Green |
| 6,460,140 | B1 | 10/2002 | Schoch et al. |
| 6,463,534 | B1 | 10/2002 | Geiger et al. |
| 6,496,858 | B1 | 12/2002 | Frailong et al. |
| 6,507,909 | B1 | 1/2003 | Zurko |
| 6,567,793 | B1 | 5/2003 | Hicks et al. |
| 6,571,216 | B1 | 5/2003 | Garg et al. |
| 6,581,102 | B1 | 6/2003 | Amini |
| 6,585,158 | B2 | 7/2003 | Norskog |
| 6,587,684 | B1 | 7/2003 | Hsu et al. |
| 6,609,201 | B1 | 8/2003 | Folmsbee |
| 6,625,729 | B1 | 9/2003 | Angelo |
| 6,631,478 | B1 | 10/2003 | Wang et al. |
| 6,646,244 | B2 | 11/2003 | Aas et al. |
| 6,664,948 | B2 | 12/2003 | Crane et al. |
| 6,671,803 | B1 | 12/2003 | Pasieka |
| 6,678,828 | B1 | 1/2004 | Pham et al. |
| 6,690,556 | B2 | 2/2004 | Smola et al. |
| 6,694,000 | B2 | 2/2004 | Ung et al. |
| 6,704,873 | B1 | 3/2004 | Underwood |
| 6,708,176 | B2 | 3/2004 | Strunk et al. |
| 6,711,263 | B1 | 3/2004 | Nordenstam et al. |
| 6,716,652 | B1 | 4/2004 | Ortlieb |
| 6,738,810 | B1 | 5/2004 | Kramer et al. |
| 6,763,458 | B1 | 7/2004 | Watanabe |
| 6,765,470 | B2 | 7/2004 | Shinzaki |
| 6,772,340 | B1 | 8/2004 | Peinado |
| 6,791,157 | B1 | 9/2004 | Casto et al. |
| 6,799,270 | B1 | 9/2004 | Bull |
| 6,816,596 | B1 | 11/2004 | Peinado |
| 6,816,809 | B2 | 11/2004 | Circenis |
| 6,816,900 | B1 | 11/2004 | Vogel et al. |
| 6,829,708 | B1 | 12/2004 | Peinado |
| 6,834,352 | B2 | 12/2004 | Shin |
| 6,839,841 | B1 | 1/2005 | Medvinsky et al. |
| 6,844,871 | B1 | 1/2005 | Hinckley et al. |
| 6,847,942 | B1 | 1/2005 | Land et al. |
| 6,850,252 | B1 | 2/2005 | Hoffberg |
| 6,851,051 | B1 | 2/2005 | Bolle et al. |
| 6,853,380 | B2 | 2/2005 | Alcorn |
| 6,868,433 | B1 | 3/2005 | Philyaw |
| 6,871,283 | B1 | 3/2005 | Zurko et al. |
| 6,895,504 | B1 | 5/2005 | Zhang |
| 6,920,567 | B1 | 7/2005 | Doherty et al. |
| 6,931,545 | B1 | 8/2005 | Ta |
| 6,934,942 | B1 | 8/2005 | Chilimbi |
| 6,954,728 | B1 | 10/2005 | Kusumoto et al. |
| 6,957,186 | B1 | 10/2005 | Guheen et al. |
| 6,976,162 | B1 | 12/2005 | Ellison et al. |
| 6,983,050 | B1 | 1/2006 | Yacobi et al. |
| 6,986,042 | B2 | 1/2006 | Griffin |
| 6,990,174 | B2 | 1/2006 | Eskelinen |
| 6,993,648 | B2 | 1/2006 | Goodman et al. |
| 7,000,100 | B2 | 2/2006 | Lacombe et al. |
| 7,000,829 | B2 | 2/2006 | Harris et al. |
| 7,013,384 | B2 | 3/2006 | Challener et al. |
| 7,016,498 | B2 | 3/2006 | Peinado |
| 7,028,149 | B2 | 4/2006 | Grawrock |
| 7,039,801 | B2 | 5/2006 | Narin |
| 7,043,633 | B1 | 5/2006 | Fink |
| 7,052,530 | B2 | 5/2006 | Edlund et al. |
| 7,054,468 | B2 | 5/2006 | Yang |
| 7,069,442 | B2 | 6/2006 | Sutton, II |
| 7,069,595 | B2 | 6/2006 | Cognigni et al. |
| 7,076,652 | B2 | 7/2006 | Ginter et al. |
| 7,096,469 | B1 | 8/2006 | Kubala et al. |
| 7,097,357 | B2 | 8/2006 | Johnson et al. |
| 7,103,574 | B1 | 9/2006 | Peinado |
| 7,113,912 | B2 | 9/2006 | Stefik |
| 7,117,183 | B2 | 10/2006 | Blair et al. |
| 7,120,250 | B2 | 10/2006 | Candelore |
| 7,121,460 | B1 | 10/2006 | Parsons et al. |
| 7,124,938 | B1 | 10/2006 | Marsh |
| 7,127,579 | B2 | 10/2006 | Zimmer |
| 7,130,951 | B1 | 10/2006 | Christie et al. |
| 7,131,004 | B1 | 10/2006 | Lyle |
| 7,143,297 | B2 | 11/2006 | Buchheit et al. |
| 7,162,645 | B2 | 1/2007 | Iguchi et al. |
| 7,171,539 | B2 | 1/2007 | Mansell et al. |
| 7,174,457 | B1 | 2/2007 | England et al. |
| 7,200,760 | B2 | 4/2007 | Riebe |
| 7,203,310 | B2 | 4/2007 | England |
| 7,207,039 | B2 | 4/2007 | Komarla et al. |
| 7,213,266 | B1 | 5/2007 | Maher |
| 7,222,062 | B2 | 5/2007 | Goud |
| 7,233,666 | B2 | 6/2007 | Lee |
| 7,233,948 | B1 | 6/2007 | Shamoon |
| 7,234,144 | B2 | 6/2007 | Wilt et al. |
| 7,236,455 | B1 | 6/2007 | Proudler et al. |
| 7,254,836 | B2 | 8/2007 | Alkove |
| 7,266,569 | B2 | 9/2007 | Cutter et al. |
| 7,278,165 | B2 | 10/2007 | Molaro |
| 7,290,699 | B2 | 11/2007 | Reddy |
| 7,296,154 | B2 | 11/2007 | Evans |
| 7,296,296 | B2 | 11/2007 | Dunbar |
| 7,299,358 | B2 | 11/2007 | Chateau et al. |
| 7,299,504 | B1 | 11/2007 | Tiller |
| 7,340,055 | B2 | 3/2008 | Hori |
| 7,343,496 | B1 | 3/2008 | Hsiang |
| 7,350,228 | B2 | 3/2008 | Peled |
| 7,353,209 | B1 | 4/2008 | Peinado |
| 7,353,402 | B2 | 4/2008 | Bourne et al. |
| 7,356,709 | B2 | 4/2008 | Gunyakti et al. |
| 7,359,807 | B2 | 4/2008 | Frank et al. |
| 7,360,253 | B2 | 4/2008 | Frank et al. |
| 7,376,976 | B2 | 5/2008 | Fierstein |
| 7,382,879 | B1 | 6/2008 | Miller |
| 7,392,429 | B2 | 6/2008 | Westerinen et al. |
| 7,395,245 | B2 | 7/2008 | Okamoto et al. |
| 7,395,452 | B2 | 7/2008 | Nicholson et al. |
| 7,406,446 | B2 | 7/2008 | Frank et al. |
| 7,406,603 | B1 | 7/2008 | MacKay |
| 7,421,413 | B2 | 9/2008 | Frank et al. |
| 7,426,752 | B2 | 9/2008 | Agrawal |
| 7,441,121 | B2 | 10/2008 | Cutter |
| 7,441,246 | B2 | 10/2008 | Auerbach et al. |
| 7,461,249 | B1 | 12/2008 | Pearson et al. |
| 7,464,103 | B2 | 12/2008 | Siu |
| 7,490,356 | B2 | 2/2009 | Lieblich et al. |
| 7,493,487 | B2 | 2/2009 | Phillips et al. |
| 7,494,277 | B2 | 2/2009 | Setala |
| 7,499,545 | B1 | 3/2009 | Bagshaw |
| 7,500,267 | B2 | 3/2009 | McKune |
| 7,519,816 | B2 | 4/2009 | Phillips et al. |
| 7,526,649 | B2 | 4/2009 | Wiseman |
| 7,539,863 | B2 | 5/2009 | Phillips |
| 7,540,024 | B2 | 5/2009 | Phillips et al. |

(56) References Cited

U.S. PATENT DOCUMENTS

| | | |
|---|---|---|
| 7,549,060 B2 | 6/2009 | Bourne et al. |
| 7,552,331 B2 | 6/2009 | Evans |
| 7,558,463 B2 | 7/2009 | Jain |
| 7,562,220 B2 | 7/2009 | Frank et al. |
| 7,565,325 B2 | 7/2009 | Lenard |
| 7,568,096 B2 | 7/2009 | Evans et al. |
| 7,574,747 B2 | 8/2009 | Oliveira |
| 7,584,502 B2 | 9/2009 | Alkove |
| 7,590,841 B2 | 9/2009 | Sherwani |
| 7,596,784 B2 | 9/2009 | Abrams |
| 7,609,653 B2 | 10/2009 | Amin |
| 7,610,631 B2 | 10/2009 | Frank et al. |
| 7,617,401 B2 | 11/2009 | Marsh |
| 7,644,239 B2 | 1/2010 | Westerinen et al. |
| 7,653,943 B2 | 1/2010 | Evans |
| 7,665,143 B2 | 2/2010 | Havens |
| 7,669,056 B2 | 2/2010 | Frank |
| 7,694,153 B2 | 4/2010 | Ahdout |
| 7,703,141 B2 | 4/2010 | Alkove |
| 7,739,505 B2 | 6/2010 | Reneris |
| 7,752,674 B2 | 7/2010 | Evans |
| 7,770,205 B2 | 8/2010 | Frank |
| 7,810,163 B2 | 10/2010 | Evans |
| 7,814,532 B2 | 10/2010 | Cromer et al. |
| 7,822,863 B2 | 10/2010 | Balfanz |
| 7,860,250 B2 | 12/2010 | Russ |
| 7,877,607 B2 | 1/2011 | Circenis |
| 7,881,315 B2 | 2/2011 | Haveson |
| 7,891,007 B2 | 2/2011 | Waxman et al. |
| 7,900,140 B2 | 3/2011 | Mohammed |
| 7,903,117 B2 | 3/2011 | Howell |
| 7,958,029 B1 | 6/2011 | Bobich et al. |
| 7,979,721 B2 | 7/2011 | Westerinen |
| 2001/0021252 A1 | 9/2001 | Carter |
| 2001/0034711 A1 | 10/2001 | Tashenberg |
| 2001/0044782 A1 | 11/2001 | Hughes |
| 2001/0056413 A1 | 12/2001 | Satoru et al. |
| 2001/0056539 A1 | 12/2001 | Pavlin et al. |
| 2002/0002597 A1 | 1/2002 | Morrell, Jr. |
| 2002/0002674 A1 | 1/2002 | Grimes |
| 2002/0007310 A1 | 1/2002 | Long |
| 2002/0010863 A1 | 1/2002 | Mankefors |
| 2002/0012432 A1 | 1/2002 | England |
| 2002/0023207 A1 | 2/2002 | Olik |
| 2002/0023212 A1 | 2/2002 | Proudler |
| 2002/0036991 A1 | 3/2002 | Inoue |
| 2002/0046098 A1 | 4/2002 | Maggio |
| 2002/0049679 A1 | 4/2002 | Russell |
| 2002/0055906 A1 | 5/2002 | Katz et al. |
| 2002/0057795 A1 | 5/2002 | Spurgat |
| 2002/0091569 A1 | 7/2002 | Kitaura et al. |
| 2002/0095603 A1 | 7/2002 | Godwin |
| 2002/0097872 A1 | 7/2002 | Maliszewski |
| 2002/0103880 A1 | 8/2002 | Konetski |
| 2002/0104096 A1 | 8/2002 | Cramer |
| 2002/0107701 A1 | 8/2002 | Batty et al. |
| 2002/0111916 A1 | 8/2002 | Coronna et al. |
| 2002/0112171 A1 | 8/2002 | Ginter et al. |
| 2002/0116707 A1 | 8/2002 | Morris |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0164018 A1 | 11/2002 | Wee |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0193101 A1 | 12/2002 | McAlinden |
| 2002/0194132 A1 | 12/2002 | Pearson et al. |
| 2003/0004880 A1 | 1/2003 | Banerjee |
| 2003/0005135 A1 | 1/2003 | Inoue et al. |
| 2003/0005335 A1 | 1/2003 | Watanabe |
| 2003/0014323 A1 | 1/2003 | Scheer |
| 2003/0027549 A1 | 2/2003 | Kiel et al. |
| 2003/0028454 A1 | 2/2003 | Ooho et al. |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0046026 A1 | 3/2003 | Levy et al. |
| 2003/0048473 A1 | 3/2003 | Rosen |
| 2003/0055898 A1 | 3/2003 | Yeager |
| 2003/0056107 A1 | 3/2003 | Cammack et al. |
| 2003/0065918 A1 | 4/2003 | Willey |
| 2003/0069981 A1 | 4/2003 | Trovato |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084306 A1 | 5/2003 | Abburi |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0097655 A1 | 5/2003 | Novak |
| 2003/0110388 A1 | 6/2003 | Pavlin et al. |
| 2003/0115147 A1 | 6/2003 | Feldman |
| 2003/0115458 A1 | 6/2003 | Song |
| 2003/0120935 A1 | 6/2003 | Teal |
| 2003/0126086 A1 | 7/2003 | Safadi |
| 2003/0126519 A1 | 7/2003 | Odorcic |
| 2003/0131252 A1 | 7/2003 | Barton et al. |
| 2003/0133576 A1 | 7/2003 | Grumiaux |
| 2003/0135380 A1 | 7/2003 | Lehr et al. |
| 2003/0149671 A1 | 8/2003 | Yamamoto et al. |
| 2003/0156572 A1 | 8/2003 | Hui et al. |
| 2003/0156719 A1 | 8/2003 | Cronce |
| 2003/0159037 A1 | 8/2003 | Taki |
| 2003/0163383 A1 | 8/2003 | Engelhart |
| 2003/0163712 A1 | 8/2003 | LaMothe et al. |
| 2003/0165241 A1 | 9/2003 | Fransdonk |
| 2003/0172376 A1 | 9/2003 | Coffin, III et al. |
| 2003/0185395 A1 | 10/2003 | Lee |
| 2003/0188165 A1 | 10/2003 | Sutton et al. |
| 2003/0188179 A1 | 10/2003 | Challener |
| 2003/0196102 A1 | 10/2003 | McCarroll |
| 2003/0196106 A1 | 10/2003 | Erfani et al. |
| 2003/0200336 A1 | 10/2003 | Pal |
| 2003/0208338 A1 | 11/2003 | Challener et al. |
| 2003/0208573 A1 | 11/2003 | Harrison et al. |
| 2003/0219127 A1 | 11/2003 | Russ |
| 2003/0221100 A1 | 11/2003 | Russ |
| 2003/0229702 A1 | 12/2003 | Hensbergen et al. |
| 2003/0236978 A1 | 12/2003 | Evans et al. |
| 2004/0001088 A1 | 1/2004 | Stancil et al. |
| 2004/0003190 A1 | 1/2004 | Childs et al. |
| 2004/0003268 A1 | 1/2004 | Bourne |
| 2004/0003269 A1 | 1/2004 | Waxman |
| 2004/0003270 A1 | 1/2004 | Bourne |
| 2004/0003288 A1 | 1/2004 | Wiseman et al. |
| 2004/0010440 A1 | 1/2004 | Lenard et al. |
| 2004/0010684 A1 | 1/2004 | Douglas |
| 2004/0010717 A1 | 1/2004 | Simec |
| 2004/0019456 A1 | 1/2004 | Cirenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054629 A1 | 3/2004 | de Jong |
| 2004/0054907 A1 | 3/2004 | Chateau et al. |
| 2004/0054908 A1 | 3/2004 | Circenis et al. |
| 2004/0054909 A1 | 3/2004 | Serkowski et al. |
| 2004/0059937 A1 | 3/2004 | Takehiko |
| 2004/0064707 A1 | 4/2004 | McCann et al. |
| 2004/0067746 A1 | 4/2004 | Johnson |
| 2004/0073670 A1 | 4/2004 | Chack et al. |
| 2004/0083289 A1 | 4/2004 | Karger |

(56) References Cited

U.S. PATENT DOCUMENTS

| | | |
|---|---|---|
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0098583 A1 | 5/2004 | Weber |
| 2004/0107356 A1 | 6/2004 | Shamoon |
| 2004/0107359 A1 | 6/2004 | Kawano et al. |
| 2004/0107368 A1 | 6/2004 | Colvin |
| 2004/0111609 A1 | 6/2004 | Kaji |
| 2004/0123127 A1 | 6/2004 | Teicher et al. |
| 2004/0125755 A1 | 7/2004 | Roberts |
| 2004/0128251 A1 | 7/2004 | Chris et al. |
| 2004/0133794 A1 | 7/2004 | Kocher et al. |
| 2004/0139027 A1 | 7/2004 | Molaro |
| 2004/0158742 A1 | 8/2004 | Srinivasan et al. |
| 2004/0184605 A1 | 9/2004 | Soliman |
| 2004/0187001 A1 | 9/2004 | Bousis |
| 2004/0193919 A1 | 9/2004 | Dabbish et al. |
| 2004/0199769 A1 | 10/2004 | Proudler |
| 2004/0205028 A1 | 10/2004 | Verosub |
| 2004/0205357 A1 | 10/2004 | Kuo et al. |
| 2004/0210695 A1 | 10/2004 | Weber |
| 2004/0220858 A1 | 11/2004 | Maggio |
| 2004/0225894 A1 | 11/2004 | Colvin |
| 2004/0249768 A1 | 12/2004 | Kontio |
| 2004/0255000 A1 | 12/2004 | Simionescu et al. |
| 2004/0268120 A1 | 12/2004 | Mirtal et al. |
| 2005/0010766 A1 | 1/2005 | Holden |
| 2005/0015343 A1 | 1/2005 | Nagai et al. |
| 2005/0021859 A1 | 1/2005 | Willian |
| 2005/0021944 A1 | 1/2005 | Craft et al. |
| 2005/0021992 A1 | 1/2005 | Aida |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0044391 A1 | 2/2005 | Noguchi |
| 2005/0044397 A1 | 2/2005 | Bjorkengren |
| 2005/0050355 A1 | 3/2005 | Graunke |
| 2005/0060388 A1 | 3/2005 | Tatsumi et al. |
| 2005/0060542 A1 | 3/2005 | Risan |
| 2005/0065880 A1 | 3/2005 | Amato et al. |
| 2005/0066353 A1 | 3/2005 | Fransdonk |
| 2005/0071280 A1 | 3/2005 | Irwin |
| 2005/0080701 A1 | 4/2005 | Tunney et al. |
| 2005/0089164 A1 | 4/2005 | Lang |
| 2005/0091104 A1 | 4/2005 | Abraham |
| 2005/0091488 A1 | 4/2005 | Dunbar |
| 2005/0091526 A1 | 4/2005 | Alkove |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120251 A1 | 6/2005 | Fukumori |
| 2005/0123276 A1 | 6/2005 | Sugaya |
| 2005/0125673 A1 | 6/2005 | Cheng et al. |
| 2005/0129296 A1 | 6/2005 | Setala |
| 2005/0131832 A1 | 6/2005 | Fransdonk |
| 2005/0132150 A1 | 6/2005 | Jewell et al. |
| 2005/0138370 A1 | 6/2005 | Goud et al. |
| 2005/0138389 A1 | 6/2005 | Catherman et al. |
| 2005/0138406 A1 | 6/2005 | Cox |
| 2005/0138423 A1 | 6/2005 | Ranganathan |
| 2005/0141717 A1 | 6/2005 | Cromer et al. |
| 2005/0144099 A1 | 6/2005 | Deb et al. |
| 2005/0149722 A1 | 7/2005 | Wiseman |
| 2005/0149729 A1 | 7/2005 | Zimmer |
| 2005/0166051 A1 | 7/2005 | Buer |
| 2005/0172121 A1 | 8/2005 | Risan |
| 2005/0182921 A1 | 8/2005 | Duncan |
| 2005/0182940 A1 | 8/2005 | Sutton |
| 2005/0188843 A1 | 9/2005 | Edlund et al. |
| 2005/0203801 A1 | 9/2005 | Morgenstern et al. |
| 2005/0204205 A1 | 9/2005 | Ring |
| 2005/0210252 A1 | 9/2005 | Freeman |
| 2005/0213761 A1 | 9/2005 | Walmsley et al. |
| 2005/0216577 A1 | 9/2005 | Durham et al. |
| 2005/0221766 A1 | 10/2005 | Brizek et al. |
| 2005/0235141 A1 | 10/2005 | Ibrahim et al. |
| 2005/0240533 A1 | 10/2005 | Cutter et al. |
| 2005/0240985 A1 | 10/2005 | Alkove |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0251803 A1 | 11/2005 | Turner |
| 2005/0257073 A1 | 11/2005 | Bade |
| 2005/0262022 A1 | 11/2005 | Oliveira |
| 2005/0265549 A1 | 12/2005 | Sugiyama |
| 2005/0268115 A1 | 12/2005 | Barde |
| 2005/0268174 A1* | 12/2005 | Kumagai ..................... 714/38 |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0286476 A1 | 12/2005 | Crosswy et al. |
| 2005/0289177 A1 | 12/2005 | Hohmann, II |
| 2005/0289343 A1 | 12/2005 | Tahan |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1* | 1/2006 | Liu .............................. 713/176 |
| 2006/0020784 A1 | 1/2006 | Jonker et al. |
| 2006/0020821 A1* | 1/2006 | Waltermann et al. ......... 713/189 |
| 2006/0020860 A1 | 1/2006 | Tardif |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0041943 A1 | 2/2006 | Singer |
| 2006/0045267 A1 | 3/2006 | Moore |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry et al. |
| 2006/0075014 A1 | 4/2006 | Tharappel et al. |
| 2006/0075223 A1 | 4/2006 | Bade et al. |
| 2006/0085634 A1 | 4/2006 | Jain et al. |
| 2006/0085637 A1 | 4/2006 | Pinkas |
| 2006/0085844 A1 | 4/2006 | Buer et al. |
| 2006/0089917 A1 | 4/2006 | Strom et al. |
| 2006/0090084 A1 | 4/2006 | Buer |
| 2006/0100010 A1 | 5/2006 | Gatto et al. |
| 2006/0106845 A1 | 5/2006 | Frank et al. |
| 2006/0106920 A1 | 5/2006 | Steeb et al. |
| 2006/0107306 A1 | 5/2006 | Thirumalai et al. |
| 2006/0107328 A1 | 5/2006 | Frank et al. |
| 2006/0107335 A1 | 5/2006 | Frank et al. |
| 2006/0112267 A1 | 5/2006 | Zimmer et al. |
| 2006/0117177 A1 | 6/2006 | Buer |
| 2006/0129496 A1 | 6/2006 | Chow |
| 2006/0129824 A1 | 6/2006 | Hoff et al. |
| 2006/0130130 A1 | 6/2006 | Kablotsky |
| 2006/0143431 A1 | 6/2006 | Rothman |
| 2006/0149966 A1 | 7/2006 | Buskey |
| 2006/0156416 A1 | 7/2006 | Huotari |
| 2006/0165005 A1 | 7/2006 | Frank et al. |
| 2006/0168664 A1 | 7/2006 | Frank et al. |
| 2006/0173787 A1 | 8/2006 | Weber |
| 2006/0206618 A1 | 9/2006 | Zimmer et al. |
| 2006/0212945 A1* | 9/2006 | Donlin et al. .................... 726/29 |
| 2006/0213997 A1 | 9/2006 | Frank et al. |
| 2006/0230042 A1 | 10/2006 | Butler |
| 2006/0242406 A1 | 10/2006 | Barde |
| 2006/0248594 A1 | 11/2006 | Grigorovitch |
| 2006/0282319 A1 | 12/2006 | Maggio |
| 2006/0282899 A1 | 12/2006 | Raciborski |
| 2007/0033102 A1 | 2/2007 | Frank et al. |
| 2007/0058807 A1 | 3/2007 | Marsh |
| 2007/0280422 A1 | 12/2007 | Setala |
| 2008/0040800 A1 | 2/2008 | Park |
| 2008/0256647 A1 | 10/2008 | Kim |
| 2009/0070454 A1 | 3/2009 | McKinnon, III et al. |
| 2010/0146576 A1 | 6/2010 | Costanzo |
| 2010/0177891 A1 | 7/2010 | Keidar |
| 2010/0250927 A1 | 9/2010 | Bradley |
| 2011/0128290 A1 | 6/2011 | Howell |

(56) References Cited

U.S. PATENT DOCUMENTS

FOREIGN PATENT DOCUMENTS

| | | |
|---|---|---|
| CN | 1393783 | 1/2003 |
| CN | 1396568 | 2/2003 |
| CN | 1531673 | 9/2004 |
| CN | 1617152 | 5/2005 |
| EP | 0 387 599 | 9/1990 |
| EP | 0 409 397 | 1/1991 |
| EP | 0 613 073 | 8/1994 |
| EP | 0635790 | 1/1995 |
| EP | 0 679 978 | 11/1995 |
| EP | 0 715 246 | 6/1996 |
| EP | 0 715 247 | 6/1996 |
| EP | 0 735 719 | 10/1996 |
| EP | 0 778 512 | 6/1997 |
| EP | 0843449 | 5/1998 |
| EP | 0 994 475 | 4/2000 |
| EP | 1 045 388 | 10/2000 |
| EP | 1061465 | 12/2000 |
| EP | 1 083 480 | 3/2001 |
| EP | 1085396 | 3/2001 |
| EP | 1 128 342 | 8/2001 |
| EP | 1120967 | 8/2001 |
| EP | 1 130 492 | 9/2001 |
| EP | 1 191 422 | 3/2002 |
| EP | 1 338 992 | 8/2003 |
| EP | 1 376 302 | 1/2004 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| EP | 1 582 962 | 10/2005 |
| GB | 2359969 | 9/2001 |
| GB | 2378780 | 2/2003 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | 2001526550 | 5/1997 |
| JP | H09185504 | 7/1997 |
| JP | H9251494 | 9/1997 |
| JP | 2000-242491 | 9/2000 |
| JP | 2000293369 | 10/2000 |
| JP | 2001051742 | 2/2001 |
| JP | 2001-075870 | 3/2001 |
| JP | 2003510684 | 3/2001 |
| JP | 2001101033 | 4/2001 |
| JP | 2003510713 | 4/2001 |
| JP | 2001-175606 | 6/2001 |
| JP | 2001184472 | 7/2001 |
| JP | 2001-290650 | 10/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002374327 | 12/2002 |
| JP | 2003-058060 | 2/2003 |
| JP | 2003507785 | 2/2003 |
| JP | 2003-101526 | 4/2003 |
| JP | 2003-115017 | 4/2003 |
| JP | 2003-157334 | 5/2003 |
| JP | 2003140761 | 5/2003 |
| JP | 2003140762 | 5/2003 |
| JP | 2003157335 | 5/2003 |
| JP | 2003208314 | 7/2003 |
| JP | 2003248522 | 9/2003 |
| JP | 2003-284024 | 10/2003 |
| JP | 2003296487 | 10/2003 |
| JP | 2003-330560 | 11/2003 |
| JP | 2002182562 | 1/2004 |
| JP | 2004-062886 | 2/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2007525774 | 9/2007 |
| JP | H08-054952 | 2/2011 |
| KR | 20010000805 | 1/2001 |
| KR | 20020037453 | 5/2002 |
| KR | 10-2004-0000323 | 1/2004 |
| KR | 1020040098627 | 11/2004 |
| KR | 20050008439 | 1/2005 |
| KR | 20050021782 | 3/2005 |
| KR | 10-0879907 | 1/2009 |
| RU | 2 207 618 | 6/2003 |
| WO | WO 93/01550 | 1/1993 |
| WO | WO 96/13013 | 5/1996 |
| WO | WO 96/24092 | 8/1996 |
| WO | WO 96/27155 | 9/1996 |
| WO | WO-9721162 | 6/1997 |
| WO | WO 97/25798 | 7/1997 |
| WO | WO 97/43761 | 11/1997 |
| WO | WO 98/02793 | 1/1998 |
| WO | WO 98/09209 | 3/1998 |
| WO | WO 98/10381 | 3/1998 |
| WO | WO-9811478 | 3/1998 |
| WO | WO 98/21679 | 5/1998 |
| WO | WO 98/21683 | 5/1998 |
| WO | WO 98/24037 | 6/1998 |
| WO | WO 98/33106 | 7/1998 |
| WO | WO 98/37481 | 8/1998 |
| WO | WO 98/58306 | 12/1998 |
| WO | WO-0054126 | 9/2000 |
| WO | WO 00/58811 | 10/2000 |
| WO | WO 00/59150 | 10/2000 |
| WO | WO-0135293 | 5/2001 |
| WO | WO-0145012 | 6/2001 |
| WO | WO 01/52020 | 7/2001 |
| WO | WO 01/52021 | 7/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO 02/19598 | 3/2002 |
| WO | WO 02/28006 | 4/2002 |
| WO | WO 02/057865 | 7/2002 |
| WO | WO-02056155 | 7/2002 |
| WO | WO 02/088991 | 11/2002 |
| WO | WO-02103495 | 12/2002 |
| WO | WO-03009115 | 1/2003 |
| WO | WO 03/034313 | 4/2003 |
| WO | WO-03030434 | 4/2003 |
| WO | WO 03/058508 | 7/2003 |
| WO | WO03073688 | 9/2003 |
| WO | WO-03107585 | 12/2003 |
| WO | WO03107588 | 12/2003 |
| WO | WO-2004092886 | 10/2004 |
| WO | WO 2004/097606 | 11/2004 |
| WO | WO 2004/102459 | 11/2004 |
| WO | WO 2005/010763 | 2/2005 |
| WO | WO-2007032974 | 3/2007 |

OTHER PUBLICATIONS

Oh, Kyung-Seok, "Acceleration technique for volume rendering using 2D texture based ray plane casting on GPU", 2006 Intl. Conf. CIS, Nov. 3-6, 2006.

Slusallek, "Vision—An Architecture for Global Illumination Calculation", IEEE Transactions on Visualization and Computer Graphics, vol. 1, No. 1; Mar. 1995; pp. 77-96.

Zhao, Hua, "A New Watermarking Scheme for CAD Engineering Drawings", 9th Intl. Conf. Computer-Aided Industrial Design and Conceptual Design; CAID/CD 2008;Nov. 22-25, 2008.

Kuan-Ting Shen, "A New Digital Watermarking Technique for Video." Proceedings Visual 2002, Hsin Chu, Taiwan, Mar. 11-13, 2002.

Lotspiech, "Broadcast Encryption's Bright Future," IEEE Computer, Aug. 2002.

Memon, "Protecting Digital Media Content," Communications of the ACM, Jul. 1998.

(56) References Cited

OTHER PUBLICATIONS

Ripley, "Content Protection in the Digital Home," Intel Technology Journal, Nov. 2002.
Steinebach, "Digital Watermarking Basics—Applications—Limits," NFD Information—Wissenschaft und Praxis, Jul. 2002.
DMOD WorkSpace OEM Unique Features; http://www.dmod.com/oem_features, downloaded Jan. 12, 2005.
Search Report Ref 313743.02, for Application No. PCT/US06/10327, mailed Oct. 22, 2007.
Search Report Ref 313744.02, for Application No. PCT/US06/10664, mailed Oct. 23, 2007.
Preliminary Report on Patentability Ref 313744.02, for Application No. PCT/US2006/010664, mailed Nov. 22, 2007.
Arbaugh, "A Secure and Reliable Bootstrap Architecture," IEEE Symposium on Security and Privacy, May 1997, pp. 65-71.
Search Report Ref 313746.02 WO, for Application No. PCT/US05/30489, mailed Aug. 2, 2007.
EP Partial Search Report, Ref. FB19620, for Application No. 06774630.5-1243 / 1902367 PCT/US2006026915, Mar. 29, 2012.
CN First Office Action for Appliction No. 200680013409.0, Jun. 26, 2009.
CN First Office Action for Appliction No. 200580049553.5, Aug. 8, 2008.
CN First Office Action for Appliction No. 200680013372.1, Dec. 18, 2009.
Bajikar, Trusted Platform Module (TPM) based Security on Notebook PCs—White Paper, Intel Corporation, Jun. 20, 2002.
Content Protection System Architecture, A Comprehensive Framework for Content Protection, Feb. 17, 2000.
Pruneda, Windows Media Technologies: Using Windows Media Rights Manager to Protect and Distribute Digital Media, Nov. 23, 2004.
Shi, A fast MPEG video encryption algorithm, 1998.
EP Communication for Application No. 04779544.8-2212/1678570 PCT/US2004024529, reference EP35527RK900kja, Mar. 9, 2010.
EP Communication for Application No. 04 779 544.8-2212, reference EP35527RK900kja, May 10, 2010.
EP Summons to attend oral proceedings for Application No. 04779544.8-2212/1678570, reference EP35527RK900kja, May 10, 2012.
Bovet, "An Overview of Unix Kernels" 2001, 0 Reilly, USA, XP-002569419.
JP Notice of Rejection for Application No. 2006-536592, Nov. 19, 2010.
CN First Office Action for Application No. 200480003262.8, Nov. 30, 2007.
CN Second Office Action for Application No. 200480003262.8, Jun. 13, 2008.
CA Office Action for Application No. 2,511,397, Mar. 22, 2012.
PCT international Search Report and Written Opinion for Application No. PCT/US04/24529, reference MSFT-4429, May 12, 2006.
JP Notice of Rejection for Application No. 2006-536586, Nov. 12, 2010.
EP Communication for Application No. 04 779 478.9-2212, reference EP35512RK900peu, May 21, 2010.
EP Communication for Application No. 04 779 4789-2212, reference EP35512RK900peti, Apr. 3, 2012.
AU Examiner's first report on patent application No. 2004287141, Dec. 8, 2008.
PCT International Search Report and Written Opinion for Application No. PCT/US04/24433, reference MSFT-4430, Nov. 29, 2005.
CN First Office Action for Application No. 200480003286.3, Nov. 27, 2009.
CA Office Action for Application No. 2,511,531, Mar. 22, 2012.
CN First Office Action for Application No. 200480012375.4, Sep. 4, 2009.
CN Second Office Action for Application No. 200480012375.4, Feb. 12, 2010.
AU Examiner's first report on patent application No. 2004288600, Jan. 18, 2010.
RU Office Action for Application No. 2005120671, reference 2412-132263RU/4102, Aug. 15, 2008.
PCT International Search Report and Written Opinion for Application No. PCT/US04/23606, Apr. 27, 2005.
PCT International Search Report and Written Opinion for Application No. PCT/US06/09904, reference 308715.02, Jul. 11, 2008.
CN First Office Action for Application No. 200680012462.9, Mar. 10, 2010.
JP Notice of Rejection for Application No. 2008-507668, Sep. 2, 2011.
EP Communication for Application No. 06738895.9-2202/1872479 PCT/US2006009904, reference FB19160, Sep. 16, 2011.
KR Office Action for Application No. 10-2007-7020527, reference 308715.08, Apr. 9, 2012.
JP Final Rejection for Application No. 2008-507668, May 18, 2012.
Kassier, "Generic QOS Aware Media Stream Transcoding and Adaptation," Department at Distributed Systems, University of Ulm, Germany. Apr. 2003.
DRM Watch Staff, "Microsoft Extends Windows Media DRM to Non-Windows Devices," May 7, 2004.
Lee, "Gamma: A Content-Adaptation Server for Wireless Multimedia Applications," Bell Laboratories, Holmdel NJ, USA. Published in 2003.
Ihde, "Intermediary-based Transcoding Framework," Jan. 2001.
LightSurf Technologies, "LightSurf Intelligent Media Optimization and Transcoding," printed Apr. 18, 2005.
Digital 5, "Media Server," printed Apr. 18, 2005.
"Transcode", Nov. 29, 2002. XP-002293109.
"SoX—Sound eXchange". Last Updated Mar. 26, 2003. XP-002293110.
Britton, "Transcoding: Extending e-buisness to new environments", Accepted for publication Sep. 22, 2000. XP-002293153.
Britton, "Transcoding: Extending E-Business to New Environments"; IBM Systems Journal, vol. 40, No. 1, 2001.
Chandra, "Application-Level Differentiated Multimedia Web Services Using Quality Aware Transcoding"; IEEE Journal on Selected Areas of Communications, vol. 18, No. 12. Dec. 2000.
Chen, "An Adaptive Web Content Delivery System". May 21, 2000. XP-002293303.
Chen, "iMobile EE—An Enterprise Mobile Service Platform"; AT&T Labs—Research, Wireless Networks, 2003.
Chi, "Pervasive Web Content Delivery with Efficient Data Reuse", Aug. 1, 2002. XP-002293120.
Ripps, "The Multitasking Mindset Meets the Operating System", Electrical Design News, Newton, MA. Oct. 1, 1990. XP 000162745.
Huang, "A Frame-Based MPEG Characteristics Extraction Tool and Its Application in video Transcoding"; IEEE Transaction on Consumer Electronics, vol. 48, No. 3. Aug. 2002.
Lee, "Data Synchronization Protocol in Mobile Computing Environment Using SyncML"; 5th IEEE International Conference on High Speed Networks and Multimedia Communications. Chungnam National University, Taejon, Korea. 2002.
Shaha, "Multimedia Content Adaptation for QoS Management over Heterogeneous Networks". Rutgers University, Piscataway, NJ. May 11, 2001. XP-002293302.
Shen, "Caching Strategies in Transcoding-enabled Proxy Systems for Streaming Media Distribution Networks". Dec. 10, 2003. XP-002293154.
Singh, "PTC: Proxies that Transcode and Cache in Heterogeneous Web Client Environments"; Proceedings of the Third International Conference on Web Information Systems, 2002.
Lei, "Context -based media Adaptation in Pervasive Computing". University of Ottawa. Ottawa, Ontario, Canada. May 31, 2001. XP-002293137.
Hong, "On the construction of a powerful distributed authentication server without additional key management", Computer Communications, Nov. 1, 2000.
Managing Digital Rights in Online Publishing, "How two publishing houses maintain control of copyright" information Management & Technology, Jul. 2001.
Jakobsson, "Proprietary Certificates", 2002.
Kumik, "Digital Rights Management", Computers and Law, E-commerce: Technology, Oct.-Nov. 2000.

(56) References Cited

OTHER PUBLICATIONS

Torrubia, "Cryptography Regulations for E-commerce and Digital Rights Management", Computers & Security, 2001.
Zwollo, "Digital document delivery and digital rights management", Information Services & Use, 2001.
Griswold, "A Method for Protecting Copyright on Networks", IMA Intellectual Property Project Proceedings, 1994.
Kahn, "Deposit, Registration and Recordation in an Electronic Copyright Management System", Coalition for Networked information, Last updated Jul. 3, 2002.
Evans, "DRM: Is the Road to Adoption Fraught with Potholes?", 2001.
Fowler, "Technoiogy's Changing Role in Intellectual Property Rights", IT Pro, Mar.-Apr. 2002.
Gable, "The Digital Rights Conundrum", Transform Magazine—Information Lifecycle, Nov. 2001.
Gunter, "Models and Languages for Digital Rights", Proceedings of the 34th Hawaii International Conference on System Sciences, Jan. 3-6, 2001.
Peinado, "Digital Rights Management in a Multimedia Environment", SMPTE Journal, Apr. 2002.
Royan, "Content Creation and Rights Management: experiences of SCRAN (the Scottish Cultural Resources Access Network)", 2000.
Valimaki, "Digital rights management on Open and Semi-open Networks", Proceedings of the Second IEEE Workshop on Internet Applications, Jul. 23-24, 2001.
Yu, "Digital multimedia at home and content rights management", Proceedings 2002 IEEE 4th International Workshop on Networked Appliances, Jan. 15-16, 2002.
Hwang, "Protection of Digital Contents on Distributed Multimedia Environment", Proceedings of the IASTED International Conference, Internet and Multimedia Systems and Applications, Nov. 19-23, 2000.
Castro, "Secure routing for structured peer-to-peer overlay networks", Proceedings of the Fifth Symposium on Operating Systems Design and Implementation, Dec. 9-11, 2002.
Friend, "Making the Gigabit IPsec VPN Architecture Secure", Computer, Jun. 2004.
Hulicki, "Security Aspects in Content Delivery Networks", The 6th World Multiconference on Systemics, Cybernetics and Informatics. Jul. 14-18, 2002.
McGarvey, "Arbortext: Enabler of Multichannel Publishing", EContent, Apr. 2002.
Moffett, "Contributing and enabling technologies for knowledge management", International Journal Information Technology and Management, Jul. 2003.
Aviv, "Aladdin Knowledge Systems Partners with Rights Exchange, Inc. To Develop a Comprehensive Solution for Electronic Software Distribution," Aug. 3, 1998.
Amdur, "Metering Online Copyright," Jan. 16, 1996.
Amdur, "interTrust Challenges IBM Digital Content Metering; Funding, Name Change, Developer Kit Kick Off Aggressive Market Push", Report on Electronic Commerce, Jul. 23, 1996.
Armati, "Tools and standards for protection, control and presentation of data," Last updated Apr. 3, 1996.
Benjamin, "Electronic Markets and Virtual Value Chains on the Information Superhighway," Sloan Management Review, Winter 1995.
Cassidy, "A Web developer's guide to content encapsulation technology; New tools offer clever ways to distribute your programs, stories & and get paid for it", Apr. 1997.
Clark, "Software Secures Digital Content on Web", Interactive Week, Sep. 25, 1995.
Cox, "Superdistribution", Idees Fortes, Wired, Sep. 1994.
Cox, "What if there is a silver bullet", J. Object Oriented Program, Jun. 1992.
Hauser, "Does Licensing Require New Access Control Techniques?" Aug. 12, 1993.
Hudgins-Bonafield, "Selling Knowledge on the Net; Container Consortium Hopes to Revolutionize Electronic Commerce," Network Computing, Jun. 1, 1995.
"IBM spearheading intellectual property protection technology for information on the Internet," May 1, 1997.
"Technological Solutions Rise to Complement Law's Small Stick Guarding Electronic Works; Vendors fight to establish beachheads in copy-protection field," Information Law Alert, Jun. 16, 1995.
Kaplan, "IBM Cryptolopes, SuperDistribution and Digital Rights Management," Dec. 30, 1996.
Kent, "Protecting Externally Supplied Software in Small Computers," Sep. 1980.
Kohl, "Safeguarding Digital Library Contents and Users; Protecting Documents Rather Than Channels," D-Lib Magazine, Sep. 1997.
Linn, "Copyright and Information Services in the Context of the National Research and Education Network," IMA Intellectual Property Project Proceedings, Jan. 1994.
McNab, "Superdistribution works better in practical applications," Mar. 2, 1998.
Moeller, "NetTrust lets cyberspace merchants take account," PC Week, Nov. 20, 1995.
Moeller, "IBM takes charge of E-commerce; Plans client, server apps based on SET," Apr. 29, 1996.
Pemberton, "An Online interview with Jeff Crigler at IBM InfoMarket," Jul. 1996.
"Licensit: kinder, gentler copyright? Copyright management system links content, authorship information," Seybold Report on Desktop Publishing, Jul. 8, 1996.
Sibert, "The DigiBox: A Self-Protecting Container for Information Commerce," First USENIX Workshop on Electronic Commerce, Jul. 11-12, 1995.
Sibert, "Securing the Content, Not the Wire, for Information Commerce," Jul. 1995.
Smith, "A New Set of Rules for Information Commerce; Rights-protection technologies and personalized-information commerce will affect all knowledge workers" Electronic Commerce, Nov. 6, 1995.
Stefik, "Trusted Systems; Devices that enforce machine-readable rights to use the work of a musician or author may create secure ways to publish over the Internet," Scientific American, Mar. 1997.
Stefik, "Technical Perspective; Shifting the Possible: How Trusted Systems and Digital Property Rights Challenge Us to Rethink Digital Publishing," Berkeley Technology Law Journal, Spring 1997.
Tarter, "The Superdistribution Model," Soft Letter: Trends & Strategies in Software Publishing, Nov. 15, 1996.
Secor, "Rights Management in the Digital Age: Trading in Bits, Not Atoms," Spring 1997.
Weber, "Digital Right Management Technology," A Report to the International Federation of Reproduction Rights Organisations, Oct. 1995.
White, "ABYSS: An Architecture for Software Protection," IEEE Transactions on Software Engineering, Jun. 1990.
White, "ABYSS: A Trusted Architecture for Software Protection," IEEE Symposium on Security and Privacy, Apr. 27-29, 1987.
"Boxing Up Bytes". No publication date available. This reference was cited in U.S. Appl. No. 09/892,371 on Mar. 22, 2002.
Ramanujapuram, "Digital Content & Intellectual Property Rights: A specification language and tools for rights management," Dr. Dobb's Journal, Dec. 1998.
CN Notice on First Office Action for Application No. 200510056328. 6, Jul. 24, 2009.
EP Communication for Application No. 05 101 873.7-1247, reference EP34127TE900kja, Dec. 19, 2006.
JP Notice of Rejection for Application No. 2005-067120, Dec. 28, 2010.
Bellovin, "Defending Against Sequence No. Attacks" AT&T Research, IETF Standard, Internet Engineering Task Force, May 1996.
Chung Lae Kim, "Development of WDM Integrated Optical Protection Socket Module," Journal of Korean institute of Telematics and Electronics, Mar. 1996.

(56) References Cited

OTHER PUBLICATIONS

Gardan, N+P (With and Without Priority) and Virtual Channel Protection: Comparison of Availability and Application to an Optical Transport Network, 7th International Conference on Reliability and Maintainability, Jun. 18, 1990.
Microsoft, "Digital Rights Management for Audio Drivers" Updated Dec. 4, 2001, XP002342580.
Microsoft, "Hardware Platform for the Next-Generation Secure Computing Base", Windows Platform Design Notes, 2003, XP-002342581.
Microsoft, Security Model for the Next-Generation Secure Computing Base, Windows Platform Design Notes, 2003, XP002342582.
Choudhury, "Copyright Protection for Electronic Publishing Over Computer Networks", Submitted to IEEE Network Magazine Jun. 1994.
CN Third Office Action for Application No. 03145223.X, Mar. 7, 2008.
EP Communication for Application No. 03 011 235.3-1247, Reference EP27518-034/gi, Apr. 22, 2010.
EP Communication for Application No. 03 011 235.3-1247, Reference EP27518-034/gi, Nov. 4, 2011.
JP Notice of Rejection for Application No. 2003-180214, Sep. 18, 2009.
RU Official Action for Application No. 2003118755/09(020028), reference 2412-127847RU/3152, Jul. 3, 2007.
"DirectShow System Overview," Last updated Apr. 13, 2005.
"Features of the VMR," accessed on Nov. 9, 2005.
"Introduction to DirectShow Application Programming," accessed on Nov. 9, 2005.
"Overview of Data Row in DirectShow," accessed on Nov. 9, 2005.
"Plug-in Distributors," accessed on Nov. 9, 2005.
"Using the Video Mixing Renderer," accessed on Nov. 9, 2005.
"VMR Filter Components," accessed on Nov. 9, 2005.
JP Notice of Rejection for Application No. 2009-288223, Jun. 29, 2012.
EP Communication for Application No. 11007532.2-1247/2492774, Reference EP27518ITEjan, Aug. 3, 2012.
Abbadi, "Digital Rights Management Using a Mobile Phone"; Aug. 19-22, 2007, ICEC '07 Proceedings of the ninth international conference on Electronic commerce.
PCT international Search Report and Written Opinion for Application No. PCT/US06/26915, reference 313859.03, Oct. 17, 2007.
CN First Office Action for Application No. 200680025136.1, Apr. 24, 2009.
JP Notice of Rejection for Application No. 2008-521535, Jun. 10, 2011.
JP Notice of Rejection for Application No. 2008-521535, Sep. 27, 2011.
KR Preliminary Rejection for Application No. 10-2008-7000503, Sep. 27, 2012.
CN Notice on Reexamination for Application No. 200680025136.1, Jun. 17, 2013.
PCT International Search Report and Written Opinion for Application No. PCT/US06/27251, reference 311888.02, Jul. 3, 2007.
CN First Office Action for Application No. 200680026251.0, Oct. 8, 2010.
"International Search Report and Written Opinion mailed Jan. 16, 2007", Application No. PCT/US2006/034622, 6 pages.
"International Search Report and Written Opinion mailed Nov. 30, 2006", Application No. PCT/US05/40950, 8 pages.
Qiao, Daji et al., "MiSer: An Optimal Low-Energy Transmission Strategy for IEEE 802.11 a/h", obtained from ACM, (Sep. 2003), pp. 161-175.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005), pp. 22-25.
"International Search Report and Written Opinion mailed Jul. 24, 2008", Application No. PCT/US05/40966, 13 pages.

Schneier, B. "Applied Cryptography, Second Edition: Protocols, Algorithms, and Source Code in C (cloth)", (Jan. 1, 1996), 13 pages.
Goering, Richard "Web Venture Offers Metered Access to EDA Packages—Startup Winds Clocks by the hour Tools (E*CAD Will Launch Web Site That Provides Pay-Per-Use and Pay-Per-Hour Access to Range of Chip Design Software)", *Electronic Engineering Times*, (Nov. 6, 2003), 3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008, 5 pages.
Mufti, Dr. Muid et al., "Design and Implementation of a Secure Mobile IP Protocol", *Networking and Communicaiton, INCC 204*, International Conference on Jun. 11-13, 2004, 5 pages.
Davida, George I., et al., "UNIX Guardians: Active User Intervention in Data Protection", *Aerospace Computer Security Applications Conference, Fourth Dec. 12-16, 1988*, 6 pages.
Morales, Tatiana "Understanding Your Credit Score", http://www.cbsnews.com/stories/2003/04/29/earlyshow/contributors/raymartin/main55152.shtml retrieved from the Internet on Apr. 23, 2009, (Apr. 30, 2003), 3 pages.
"Achieving Peak Performance: Insights from a Global Survey on Credit Risk and Collections Practices", *GCI Group Pamphlet*, (2002, 2004), 12 pages.
"Equifax Business Solutions—Manage Your Customers", Retrieved from the Internet from http://www.equifax.com/sitePages/biz/smallBiz/?sitePage=manage Customers on Oct. 14, 2005, 3 pages.
"Prequalification Using Credit Reports", Retrieved from the Internet at http://www.credco.com/creditreports/prequalification.htm on Oct. 14, 2005, 2 pages.
Gao, Jerry et al., "Online Advertising—Taxonomy and Engineering Perspectives", http://www.engr.sisu.edu/gaojerry/report/OnlineAdvertising%20.pdf, (2002), 33 pages.
Oshiba, Takashi et al., "Personalized Advertisement-Duration Control for Streaming Delivery", *ACM Multimedia*, (2002), 8 pages.
Yue, Wei T., et al., "The Reward Based Online Shopping Community", *Routledge*, vol. 10, No. 4, (Oct. 1, 2000), 2 pages.
"International Search Report and Written Opinion mailed Nov. 8, 2007", Application No. PCT/US05/40967, 5 pages.
"International Search Report and Written Opinion", Application Serial No. PCT/US05/40940, 9 pages, May 2, 2008.
"International Search Report and Written Opinion mailed Apr. 25, 2007", Application No. PCT/US05/040965, 5 pages.
"International Search Report and Written Opinion mailed Sep. 25, 2006", Application No. PCT/US05/40949, 7 pages.
"EP Office Action mailed Nov. 17, 2006", Application No. 05110697.9, 6 pages.
"EP Office Action mailed Apr. 5, 2007", Application No. 05110697.9, 5 pages.
"EP Summons to Attend Oral Proceedings mailed Sep. 27, 2007", Application No. 05110697.9, 7 pages.
"Decision to Refuse a European Application mailed Feb. 15, 2008", Application No. 05110697.9, 45 pages.
"International Search Report and Written Opinion mailed Sep. 8, 2006", Application No. PCT/US05/040942, 20 pages.
"European Search Report mailed Dec. 6, 2010", Application No. 05820177.3, 8 pages.
Lampson, Butler et al., "Authentication in Distributed Systems: Theory and Practice", *ACM Transactions on Computer Systems*, v10, 265, (1992), 18 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 pages.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.

(56) References Cited

OTHER PUBLICATIONS

"Notice of Allowance mailed Jul. 2, 2010", Mexican Application No. MX/a/2007/005659, 2 pages.
"Extended European Search Report mailed Dec. 6, 2010", EP Application No. 05820177.3, 8 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Notice of Allowance mailed Feb. 18, 2010", Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009", Mexican Application No. MX/a/2007/005662, 7 pages.
"Notice of Allowance mailed Feb. 19, 2010", Mexican Application No. MX/a/2007/005662, 2 pages.
"Partial Search Report mailed Jul. 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Extended European Search Report mailed Jan. 21, 2010", EP Application No. 05819896.1, 8 pages.
"Office Action mailed Mar. 19, 2010", EP Application No. 05819896.1, 1 page.
"Office Action mailed Feb. 10, 2010", Mexican Application No. MX/a/2007/005656, 5 pages.
"Office Action mailed Oct. 18, 2010", Mexican Application No. MX/a/2007/005656, 3 pages.
"Notice on the First Office Action mailed Jul. 30, 2010", Chinese Application No. 200680033207.2, 7 pages.
"EP Search Report mailed Jan. 2, 2008", EP Application No. 05109616.2, 7 pages.
"Flonix: USB Desktop OS Solutions Provider, http://www.flonix.com", Retrieved from the Internet Jun. 1, 2005, (Copyright 2004), 2 pages.
"Migo by PowerHouse Technologies Group, http://www.4migo.com", Retrieved from the Internet Jun. 1, 2005, (Copyright 2003), 3 pages.
"WebServUSB. http://www.webservusb.com", Retrieved from the Internet Jun. 1, 2015, (Copyright 2004), 16 pages.
"Notice of Rejection mailed Jul. 8, 2011", Japanese Application No. 2007-541363, 10 pages.
"Notice of Rejection mailed Aug. 5, 2011", Japanese Patent Application No. 2007-552142, 8 pages.
"Forward Solutions Unveils Industry's Most Advanced Portable Personal Computing System on USB Flash Memory Device", *Proquest, PR Newswire*, http://proquest.umi.com/pqdweb?index=20&did=408811931&SrchMode=1&sid=6&Fmt=3, Retreived from the Internet Feb. 15, 2008, (Sep. 22, 2003), 3 pages.
"Office Action mailed May 26, 2008", EP Application No. 05109616.2, 5 pages.
"Notice on Division of Application mailed Aug. 8, 2008", CN Application No. 200510113398.0, 2 pages.
"Notice on First Office Action mailed Dec. 12, 2008", CN Application No. 200510113398.0.

"The Second Office Action mailed Jul. 3, 2009", CN Application No. 200510113398.0, 7 pages.
"Notice on Proceeding With the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010",Russian Application No. 2005131911, 31 pages.
"Notice of Allowance mailed Nov. 13, 2009", MX Application No. PA/a/2005/011088, 2 pages.
"TCG Specification Architecture Overview", Revision 1.2, (Apr. 28, 2004), 55 pages.
"International Search Report and Written Opinion mailed Jun. 19, 2007", PCT Application No. PCT/US05/46091, 11 pages.
"Notice on Grant of Patent Right for Invention mailed Jan. 29, 2010", CN Application No. 200580040764.2, 4 pages.
"International Search Report mailed Jan. 5, 2007", Application No. PCT/US2006/032708, 3 pages.
"Cyotec—CyoLicence", printed from www.cyotec.com/products/cyolcence on Sep. 7, 2005, (Copyright 2003-2005).
"Magic Desktop Automation Suite for the Small and Mid-Sized Business", printed from www.remedy.com/soultions/magic_it_suite.htm on Sep. 7, 2005, (Copyright 2005), 4 pages.
"PACE Anti-Piracy Introduction", printed from www.paceap.com/psintro.html on Sep. 7, 2005, (Copyright 2002), 4 pages.
"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", *ACM SIGecom Exhchanges*, vol. 3, No. 3, (Aug. 2002), pp. 17-24.
"International Search Report and Written Opinion mailed Mar. 21, 2007", Application No. PCT/US05/46223, 10 pages.
"the First Office Action mailed Oct. 9, 2009", CN Application No. 200580043102.0, 20 pages.
"International Search Report and Written Opinion mailed Jul. 9, 2008", Application No. PCT/US05/46539, 11 pages.
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No. 200680006199.2, 4 pages.
"First Office Action mailed Aug. 21, 2009", CN Application No. 20068003046.3, 8 pages.
"Notice on the First Office Action mailed Dec. 11, 2009", CN Application No. 200510127170.7, 16 pages.

(56) References Cited

OTHER PUBLICATIONS

"The Third Office Action mailed Jun. 5, 2009", CN Application No. 200680006199.2, 7 pages.
"Notice of Rejection mailed Sep. 9, 2011", JP Application No. 2007-548385, 9 pages.
"Notice of Rejection mailed Nov. 11, 2011", Japanese Application No. 2005-301957, 21 pages.
"Extended European Search Report mailed Dec. 21, 2011", EP Application No. 05854752.2, 7 pages.
"Final Rejection mailed Jan. 17, 2012", Japan Application No. 2007-552142, 8 pages.
"EP Office Action mailed Mar. 8, 2012", EP Application No. 05109616.2, 6 pages.
"Notice of Preliminary Rejection mailed May 30, 2012", Korean Patent Application No. 10-2007-7011069, 1 page.
"Extended European Search Report mailed Jul. 5, 2012", EP Application No. 05851550.3, 6 pages.
"Preliminary Rejection mailed Jul. 4, 2012", Korean Application No. 10-2007-7012294, 2 pages.
"Office Action mailed Jun. 8, 2012", JP Application No. 2005-301957, 8 pages.
KR Notice of Final Rejection for Application No. 10-2007-7024145, Reference No. 313361.12, Oct. 23, 2012.
KR Notice of Preliminary Rejection for Application No. 2007-7023842, Reference No. 313361.06, Oct. 24, 2012.
EP Communication for Application No. 04 778 899.7-2212, Reference EP35523RK900peu, Nov. 23, 2012.
Utagawa, "Making of card applications using IC Card OS MULTOS" Mar. 1, 2003.
Nakajima, Do You Really Know It? Basics of Windows2000/XP, Jan. 2004.
N+1 Network Guide, "First Special Feature, Security Oriented Web Application Development, Part 3, Method for Realizing Secure Session Management", Jan. 2004.

* cited by examiner

PROTECTED COMPUTING ENVIRONMENT

CROSS-REFERENCE TO RELATED APPLICATION

This application is a divisional of U.S. patent application Ser. No. 11/116,598 filed Apr. 27, 2005 and claims benefit to U.S. Provisional Patent Application No. 60/673,979 filed Friday, Apr. 22, 2005.

DESCRIPTION OF THE DRAWINGS

These and other features and advantages of the present example will be better understood from the following detailed description read in light of the accompanying drawings, wherein.

Like reference numerals are used to designate like elements in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples in connection with the examples illustrated. However, the same or equivalent functions and sequences may be accomplished by different examples.

Although the present examples are described and illustrated herein as being implemented in a computer operating system, the system described is provided as an example and not a limitation. As those skilled in the art will appreciate, the present examples are suitable for application in a variety of different types of computer systems.

Introduction

Figure 1:
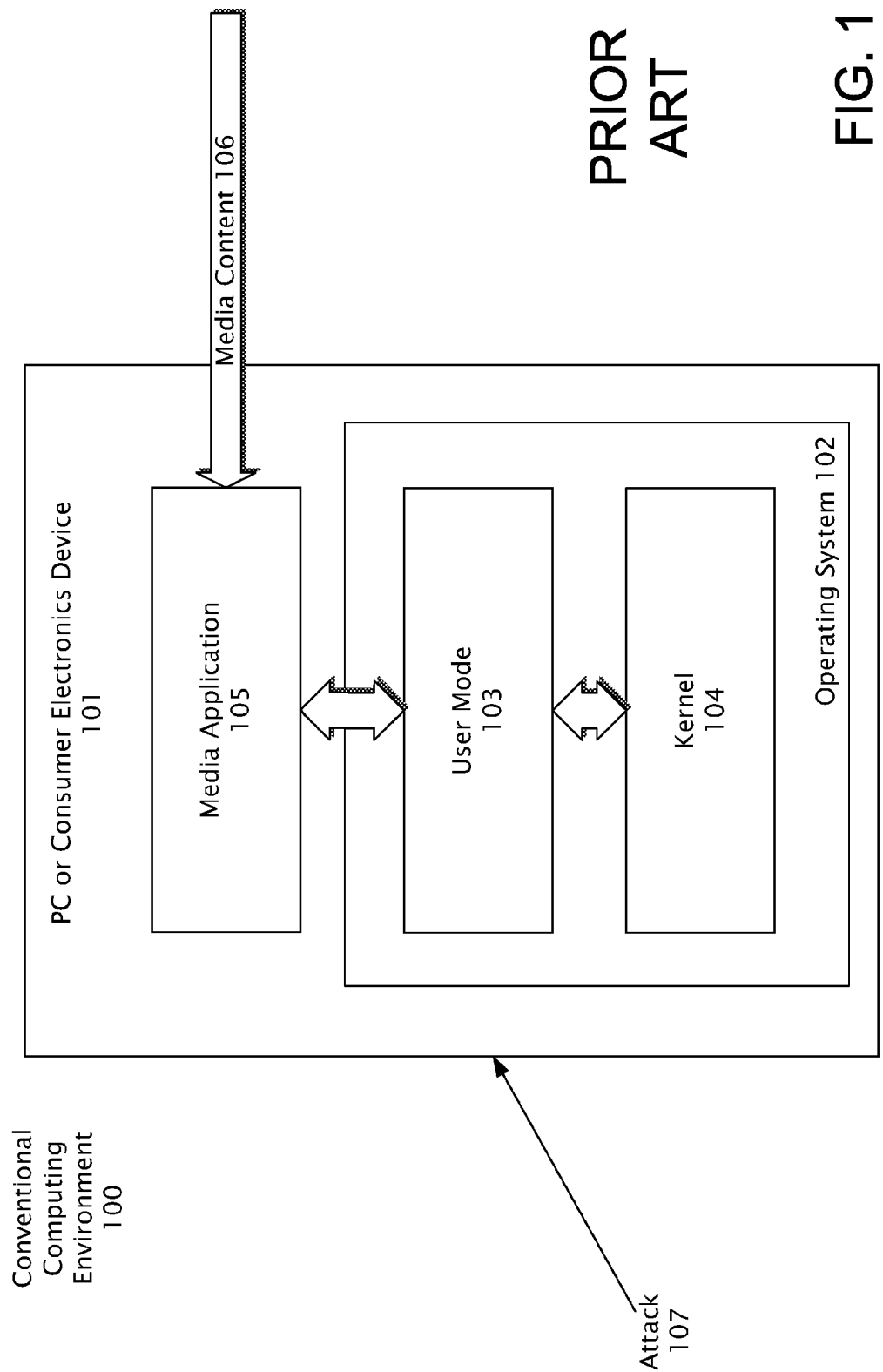
FIG. 1 is a block diagram showing a conventional media application processing media content operating in a conventional computing environment with an indication of an attack against the system.

FIG. 1 is a block diagram showing a conventional media application 105 processing media content 106 operating in a conventional computing environment 100 with an indication of an attack 107 against the system 101. A conventional computing environment 100 may be provided by a personal computer ("PC") or consumer electronics ("CE") device 101 that may include operating system ("OS") 102. Typical operating systems often partition their operation into a user mode 103, and a kernel mode 104. User mode 103 and kernel mode 104 may be used by one or more application programs 105. An application program 105 may be used to process media content 106 that may be transferred to the device 101 via some mechanism, such as a CD ROM drive, Internet connection or the like. An example of content 106 would be media files that may be used to reproduce audio and video information.

The computing environment 100 may typically include an operating system ("OS") 102 that facilitates operation of the application 105, in conjunction with the one or more central processing units ("CPU"). Many operating systems 102 may allow multiple users to have access to the operation of the CPU. Multiple users may have ranges of access privileges typically ranging from those of a typical user to those of an administrator. Administrators typically have a range of access privileges to applications 105 running on the system, the user mode 103 and the kernel 104. Such a computing environment 100 may be susceptible to various types of attacks 107. Attacks may include not only outsiders seeking to gain access to the device 101 and the content 106 on it, but also attackers having administrative rights to the device 101 or other types of users having whatever access rights granted them.

Figure 2:
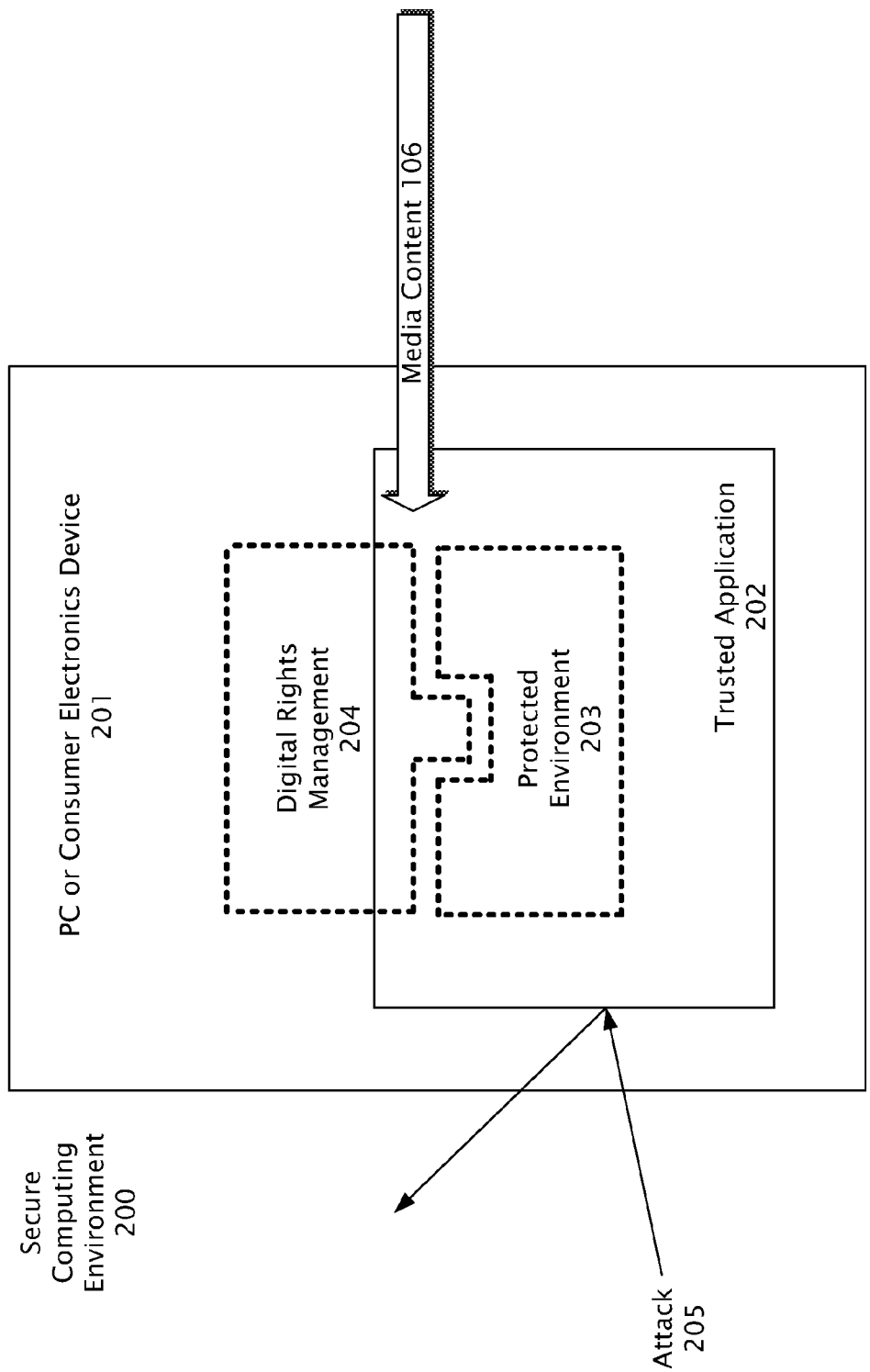
FIG. 2 is a block diagram showing a trusted application processing media content and utilizing a protected environment that tends to be resistant to attacks.

FIG. 2 is a block diagram showing a trusted application 202 processing media content 106 and utilizing a protected environment 203 that tends to be resistant to attack 205. The term "trusted application", as used here, may be defined as an application that utilizes processes operating in a protected environment such that they tend to be resistant to attack 205 and limit unauthorized access to any media content 106 or other data being processed. Thus, components or elements of an application operating in a protected environment are typically considered "trusted" as they tend to limit unauthorized access and tend to be resistant to attack. Such an application 202 may be considered a trusted application itself or it may utilize another trusted application to protect a portion of its processes and/or data.

For example, a trusted media player 202 may be designed to play media content 106 that is typically licensed only for use such that the media content 106 cannot be accessed in an unauthorized manner. Such a trusted application 202 may not operate and/or process the media content 106 unless the computing environment 200 can provide the required level of security, such as by providing a protected environment 203 resistant to attack 205.

As used herein, the term "process" can be defined as an instance of a program (including executable code, machine instructions, variables, data, state information, etc.) residing and/or operating in a kernel space, user space and/or any other space of an operating system and/or computing environment.

A digital rights management system 204 or the like may be utilized with the protected environment 203. The use of a digital rights management system 204 is merely provided as an example and may not be utilized with a protected environment or a secure computing environment. Typically a digital rights management system utilizes tamper-resistant software ("TRS") which tends to be expensive to produce and may negatively impact computing performance. Utilizing a trusted application 202 may minimize the amount of TRS functionality required to provide enhanced protection.

Various mechanisms known to those skilled in this technology area may be utilized in place of, in addition to, or in conjunction with a typical digital rights management system. These mechanisms may include, but are not limited to, encryption/decryption, key exchanges, passwords, licenses, and the like. Thus, digital right management as used herein may be a mechanism as simple as decrypting an encrypted media, utilizing a password to access data, or other tamper-resistant mechanisms. The mechanisms to perform these tasks may be very simple and entirely contained within the trusted application 202 or may be accessed via interfaces that communicate with complex systems otherwise distinct from the trusted application 202.

Figure 3:
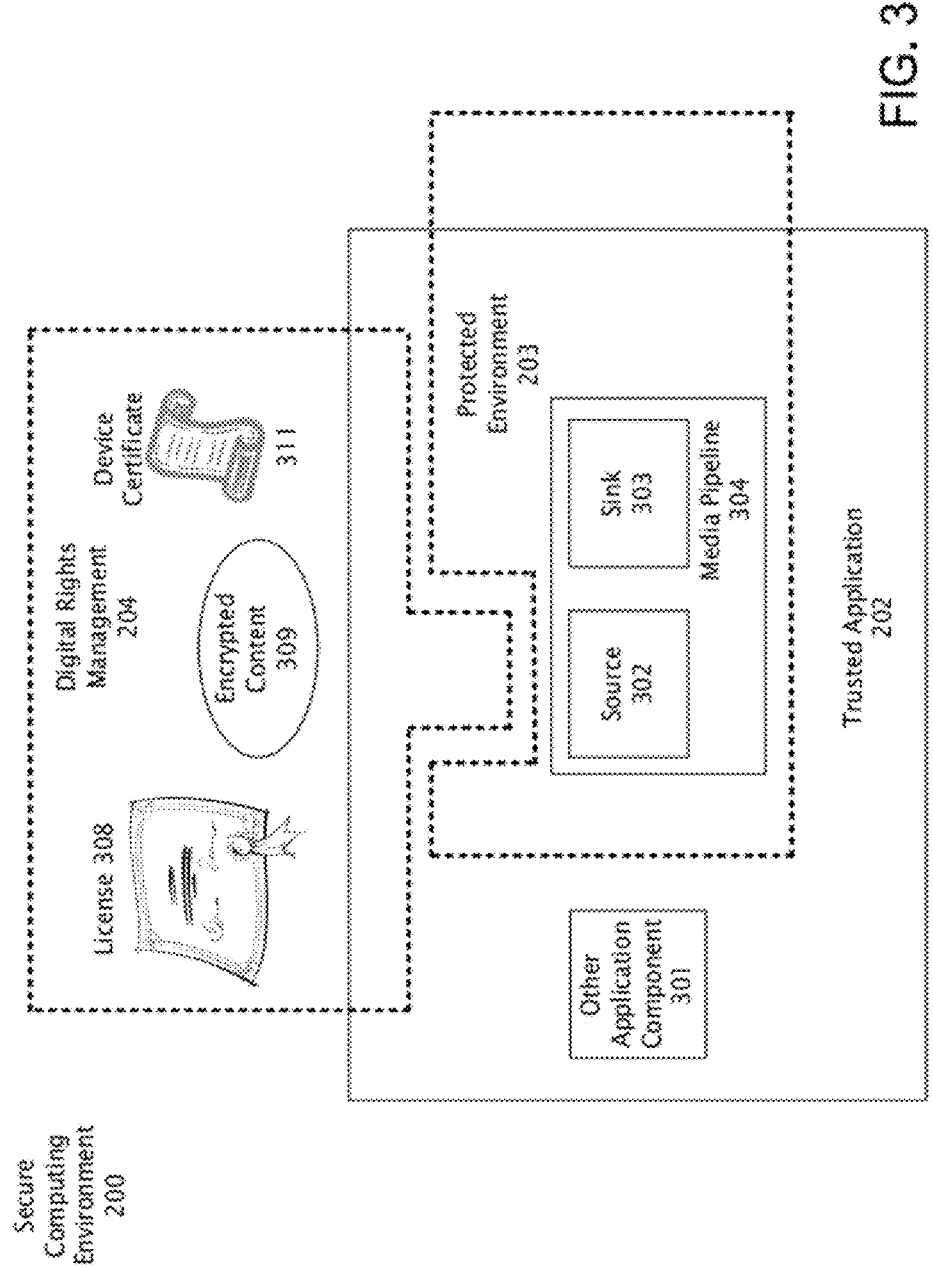
FIG. 3 is a block diagram showing exemplary components of a trusted application that may be included in the protected environment.

FIG. 3 is a block diagram showing exemplary components of a trusted application 202 that may be included in the protected environment 203. A trusted application 202 will typically utilize a protected environment 203 for at least a potion of its subcomponents 302-304. Other components 301 of the trusted application may not utilize a protected environment. Components 302-204 involved in the processing of media content or data that may call for an enhanced level of protection from attack or unauthorized access may operate within a protected environment 203. A protected environment 203 may be utilized by a single trusted application 202 or, possibly, by a plurality of trusted applications. Alternatively, a trusted application 202 may utilize a plurality of protected environments. A trusted application 202 may also couple to and/or utilize a digital rights management system 204.

In the example shown, source 302 and sink 303 are shown as part of a media pipeline 304 operating in the protected environment 203. A protected environment 203 tends to ensure that, once protected and/or encrypted content 309 has been received and decrypted, the trusted application 202 and its components prevent unauthorized access to the content 309.

Digital rights management 204 may provide a further avenue of protection for the trusted application 202 and the content 309 it processes. Through a system of licenses 308, device certificates 311, and other security mechanisms a content provider is typically able to have confidence that encrypted content 309 has been delivered to the properly authorized device and that the content 309 is used as intended.

Figure 4:
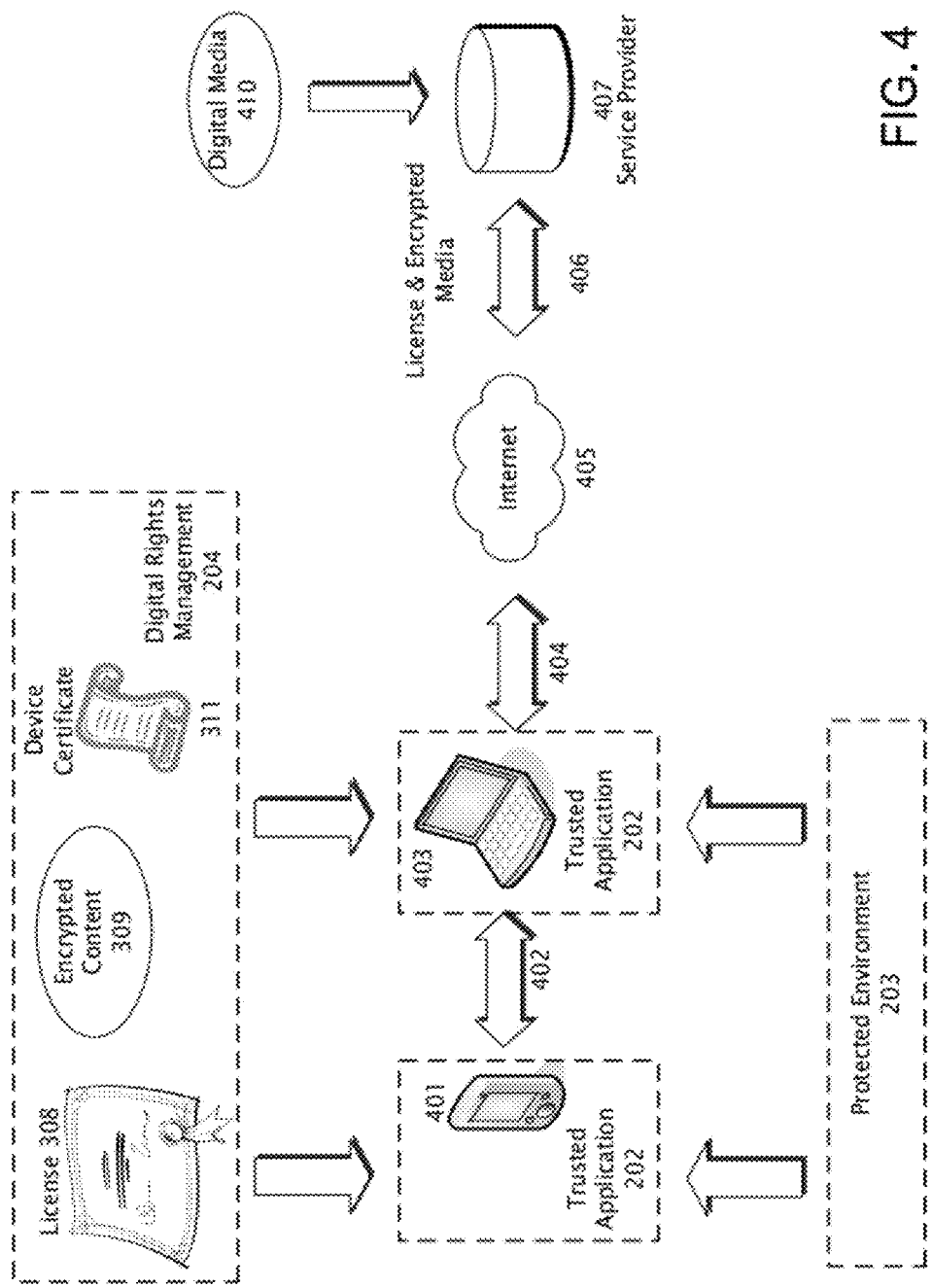
FIG. 4 is a block diagram showing a system for downloading digital media content from a service provider that utilizes an exemplary trusted application utilizing a protected environment.

FIG. 4 is a block diagram showing a system for downloading digital media content 410 from a service provider 407 to an exemplary trusted application 202 utilizing a protected environment 203. In the example shown the trusted application 202 is shown being employed in two places 401, 403. The trusted application 202 may be used in a CE device 401 or a PC 403. Digital media 410 may be downloaded via a service provider 407 and the Internet 405 for use by the trusted application 202. Alternatively, digital media may be made available to the trusted application via other mechanisms such as a network, a CD or DVD disk, or other storage media. Further, the digital media 410 may be provided in an encrypted form 309 requiring a system of decryption keys, licenses, certificates and/or the like which may take the form of a digital rights management system 204. The data or media content 410 provided to the trusted application may or may not be protected, i.e, encrypted or the like.

In one example, a trusted application 202 may utilize a digital rights management ("DRM") system 204 or the like along with a protected environment 203. In this case, the trusted application 202 is typically designed to acknowledge, and adhere to, the content's usage policies by limiting usage of the content to that authorized by the content provider via the policies. Implementing this may involve executing code which typically interrogates content licenses and subsequently makes decisions about whether or not a requested action can be taken on a piece of content. This functionality may be provided, at least in part, by a digital rights management system 204. An example of a Digital Rights Management system is provided in U.S. patent application Ser. No. 09/290,363, filed Apr. 12, 1999, U.S. patent applications Ser. Nos. 10/185,527, 10/185,278, and 10/185,511, each filed on Jun. 28, 2002 which are hereby incorporated by reference in its entirety.

Building a trusted application 202 that may be utilized in the CE device 401 or the PC 403 may include making sure the trusted application 202 which decrypts and processes the content 309 may be "secure" from malicious attacks. Thus, a protected environment 203 typically refers to an environment that may not be easy to attack.

As shown, the trusted applications 202 operate in a consumer electronics device 401, which may be periodically synced to a PC 403 that also provides a trusted application. The PC 403 is in turn coupled 404 to the internet 405. The internet connection allows digital media 410 to be provided by a service provider 407. The service provider 407 may transmit licenses and encrypted media 406 over the internet 405 to trusted application 202. Once encrypted media is delivered and decrypted it may be susceptible to various forms of attack.

Protected Environments and Potential Attacks

A protected computing environment tends to provide an environment that limits hackers from gaining access to unauthorized content. A hacker may include hackers acting as a systems administrator. A systems administrator typically has full control of virtually all of the processes being executed on a computer, but this access may not be desirable. For example, if a system user has been granted a license to use a media file should not be acceptable for a system administrator different from the user to be able to access the media file. A protected environment tends to contribute to the creation of a process in which code that decrypts and processes content can operate without giving hackers access to the decrypted content. A protected environment may also limit unauthorized access to users of privilege, such as administrators, and/or any other user, who may otherwise gain unauthorized access to protected content. Protection may include securing typical user mode processes (FIG. 1, 103) and kernel mode processes (FIG. 1, 104) and any data they may be processing.

Processes operating in the kernel may be susceptible to attack. For example, in the kernel of a typical operating system objects are created, including processes, that may allow unlimited access by an administrator. Thus, an administrator, typically with full access privileges, may access virtually all processes.

Protected content may include policy or similar information indicating the authorized use of the content. Such policy may be enforced via a DRM system or other security mechanism. Typically, access to protected content is granted through the DRM system or other mechanism, which may enforce policy. However, a system administrator, with full access to the system, may alter the state of the DRM system or mechanism to disregard the content policy.

A protected environment tends to provide a protected space that restricts unauthorized access to media content being processed therein, even for high-privilege users such as an administrator. When a protected environment is used in conjunction with a system of digital rights management or the like, a trusted application may be created in which a content provider may feel that adequate security is provided to protect digital media from unauthorized access and may also protect the content's policy from be tampered with along with any other data, keys or protection mechanisms that may be associated with the media content.

Attack Vectors

Current operating system ("OS") architectures typically present numerous possible attack vectors that could compromise a media application and any digital media content being processed. For purposes of this example, attacks that may occur in an OS are grouped into two types of attacks, which are kernel mode attacks and user mode attacks.

The first type of attack is the kernel mode attack. Kernel mode is typically considered to be the trusted base of the operating system. The core of the operating system and most system and peripheral drivers may operate in kernel mode. Typically any piece of code running in the kernel is susceptible to intrusion by any other piece of code running in the kernel, which tends not to be the case for user mode. Also, code running in kernel mode typically has access to substantially all user mode processes. A CPU may also provide privilege levels for various code types. Kernel mode code is typically assigned the highest level of privilege by such a CPU, typically giving it full access to the system.

The second type of attack is the user mode attack. Code that runs in user mode may or may not be considered trusted code by the system depending on the level of privilege it has been assigned. This level of privilege may be determined by the user context or account in which it is operating. User mode code running in the context of an administrator account may have full access to the other code running on the system. In addition, code that runs in user mode may be partitioned to prevent one user from accessing another's processes.

These attacks may be further broken down into specific attack vectors. The protected environment is typically designed to protect against unauthorized access that may otherwise be obtained via one or more of these attack vectors. The protected environment may protect against attack vectors that may include: process creation, malicious user mode applications, loading malicious code into a process, malicious kernel code, invalid trust authorities, and external attack vectors.

Process creation is a possible attack vector. An operating system typically includes a "create process" mechanism that allows a parent process to create a child process. A malicious parent process may, by modifying the create process code or by altering the data it creates, make unauthorized modifications to the child process being created. This could result in compromising digital media that may be processed by a child process created by a malicious parent process.

Malicious user mode applications are a possible attack vector. An operating system typically includes administrator level privileges. Processes running with administrator privileges may have unlimited access to many operating system mechanisms and to nearly all processes running on the computer. Thus, in Windows for example, a malicious user mode application running with administrator privileges may gain access to many other processes running on the computer and may thus compromise digital media. Similarly, processes operating in the context of any user may be attacked by any malicious process operating in the same context.

Loading malicious code into a secure process is a possible attack vector. It may be possible to append or add malicious code to a process. Such a compromised process cannot be trusted and may obtain unauthorized access to any media content or other data being processed by the modified process.

Malicious kernel mode code is a possible attack vector. An operating system typically includes a "system level" of privilege. In Windows, for example, all code running in kernel mode is typically running as system and therefore may have maximum privileges. The usual result is that drivers running in kernel mode may have maximum opportunity to attack any user mode application, for example. Such an attack by malicious kernel mode code may compromise digital media.

Invalid trust authorities (TAs) are a possible attack vector. TAs may participate in the validation of media licenses and may subsequently "unlock" the content of a digital media. TAs may be specific to a media type or format and may be implemented by media providers or their partners. As such, TAs may be pluggable and/or may be provided as dynamic link libraries ("DLL") or the like. A DLL may be loaded by executable code, including malicious code. In order for a TA to ensure that the media is properly utilized it needs to be able to ensure that the process in which it is running is secure. Otherwise the digital media may be compromised.

External attacks are another possible attack vector. There are a set of attacks that don't require malicious code running in a system in order to attack it. For instance, attaching a debugger to a process or a kernel debugger to the machine, looking for sensitive data in a binary file on a disk, etc., are all possible mechanisms for finding and compromising digital media or the processes that can access digital media.

Figure 5:
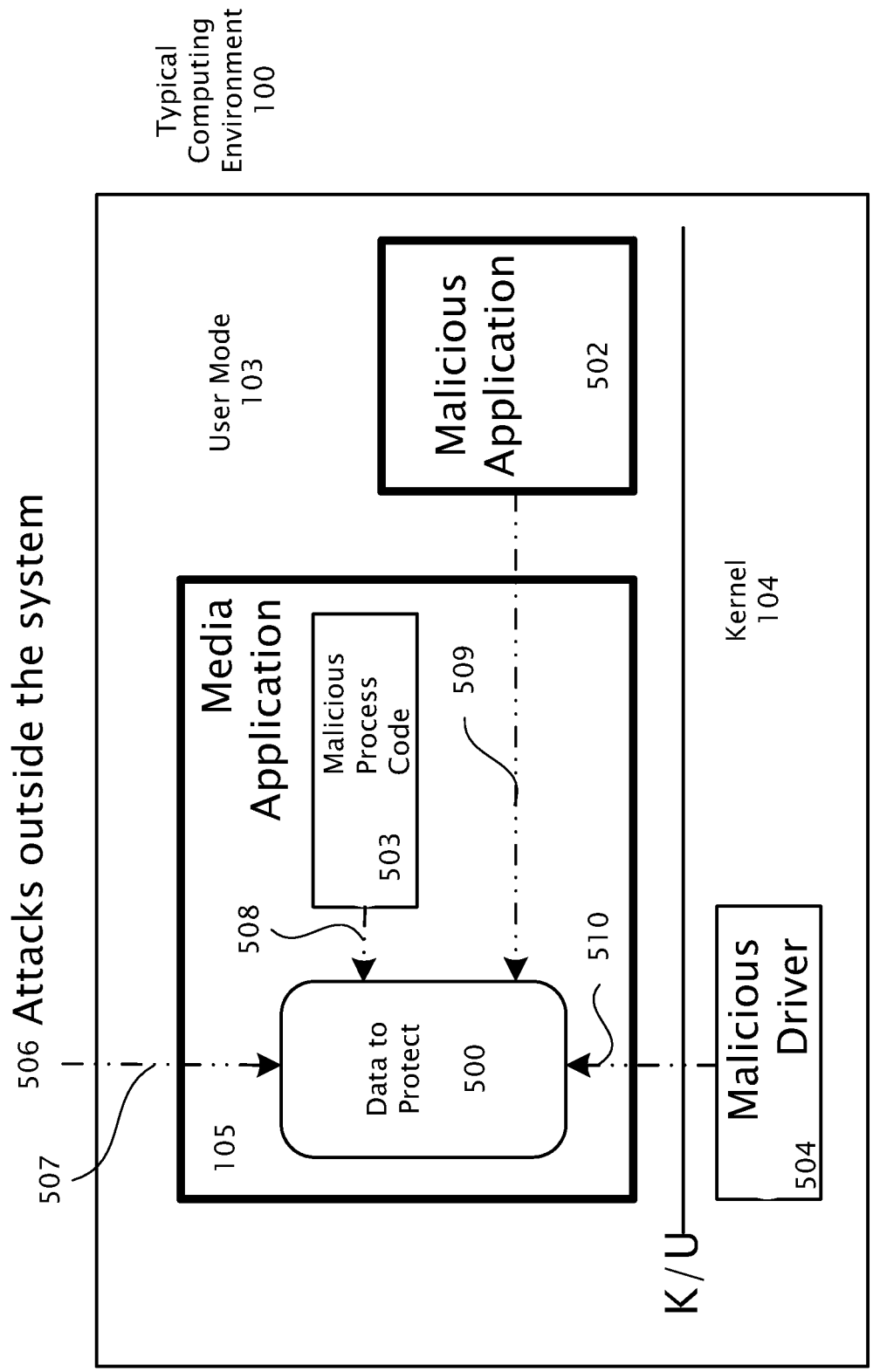
FIG. 5 is a block diagram showing exemplary attack vectors that may be exploited by a user or mechanism attempting to access media content and other data typically present in a computing environment in an unauthorized manner.

FIG. 5 is a block diagram showing exemplary attack vectors 507-510 that may be exploited by a user or mechanism attempting to access media content and other data 500 typically present in a computing environment 100 in an unauthorized manner. A protected environment may protect against these attack vectors such that unauthorized access to trusted applications and the data they process is limited and resistance to attack is provided. Such attacks may be waged by users of the system or mechanisms that may include executable code. The media application 105 is shown at the center of the diagram and the attack vectors 507-510 tend to focus on accessing sensitive data 500 being stored and/or processed by the application 105.

A possible attack vector 509 may be initiated via a malicious user mode application 502. In the exemplary operating system architecture both the parent of a process, and any process with administrative privileges, typically have unlimited access to other processes, such as one processing media content, and the data they process. Such access to media content may be unauthorized. Thus a protected environment may ensure that a trusted application and the media content it processes are resistant to attacks by other user mode applications.

A possible attack vector 508 is the loading of malicious code 503 into a process 501. Having a secure process that is resistant to attacks from the outside is typically only as secure as the code running on the inside forming the process. Given that DLLs and other code are typically loaded into processes for execution, a mechanism that may ensure that the code being loaded is trusted to run inside a process before loading it into the process may be provided in a protected environment.

A possible vector of attack 510 is through malicious kernel mode code 504. Code running in kernel mode 104 typically has maximum privileges. The result may be that drivers running in kernel mode may have a number of opportunities to attack other applications. For instance, a driver may be able to access memory directly in another process. The result of this is that a driver could, once running, get access to a processes memory which may contain decrypted "encrypted media content" (FIG. 3, 309). Kernel Mode attacks may be prevented by ensuring that the code running in the kernel is non-malicious code, as provided by this example.

A possible attack vector 507 is by external attacks 506 to the system 100. This group represents the set of attacks that typically do not require malicious code to be running on the system 100. For instance, attaching a debugger to an application and/or a process on the system, searching a machine for sensitive data, etc. A protected environment may be created to resist these types of attacks.

Creating and Maintaining Protected Environments

Figure 6:
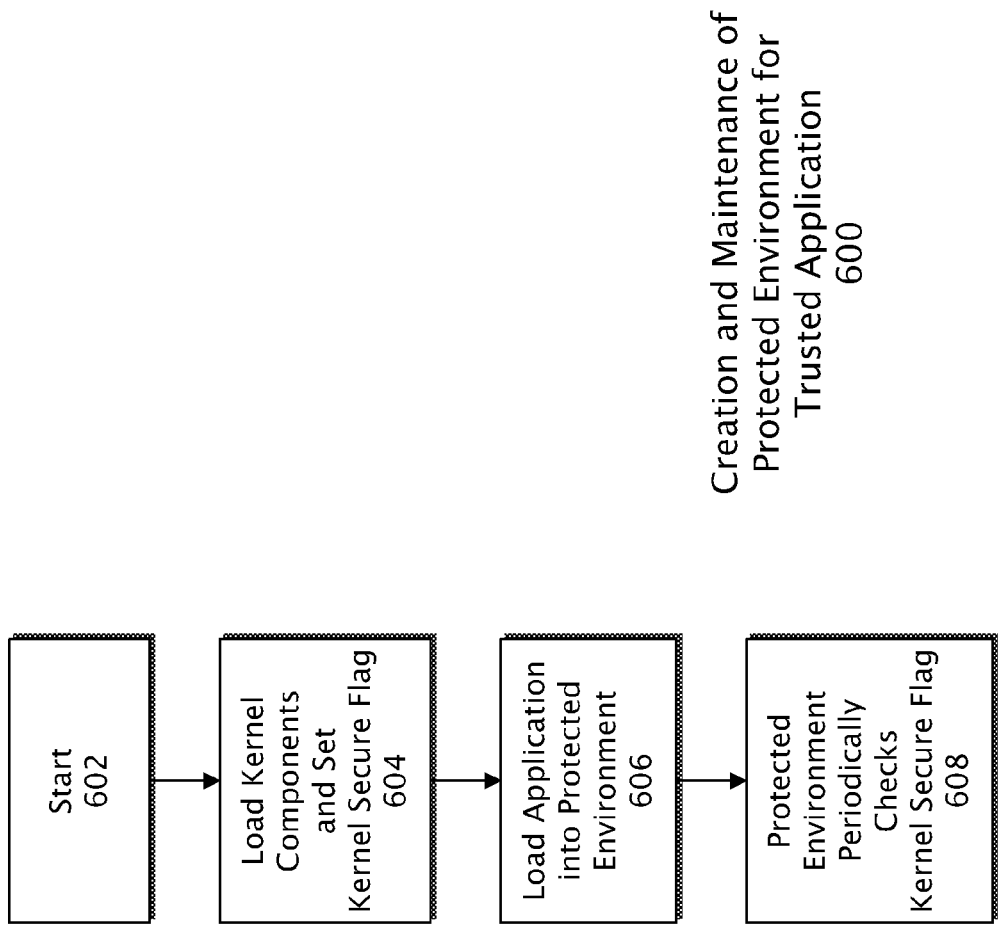
FIG. 6 is a flow diagram showing the process for creating and maintaining a protected environment that tends to limit unauthorized access to media content and other data.

FIG. 6 is a flow diagram showing the process 600 for creating and maintaining a protected environment that tends to limit unauthorized access to media content and other data. The sequence 600 begins when a computer system is started 602 and the kernel of the operating system is loaded and a kernel secure flag is set 604 to an initial value. The process continues through the time that a protected environment is typically created and an application is typically loaded into it 606. The process includes periodic checking 608 via the protected environment that seeks to ensure the system remains secure through the time the secure process is needed.

The term "kernel", as used here, is defined as the central module of an operating system for a computing environment, system or device. The kernel module may be implemented in the form of computer-executable instructions and/or electronic logic circuits. Typically, the kernel is responsible for memory management, process and task management, and storage media management of a computing environment. The term "kernel component", as used here, is defined to be a basic controlling mechanism, module, computer-executable instructions and/or electronic logic circuit that forms a portion of the kernel. For example, a kernel component may be a "loader", which may be responsible for loading other kernel components in order to establish a fully operational kernel.

To summarize the process of creating and maintaining a protected environment:

1. Block 602 represents the start-up of a computer system. This typically begins what is commonly known as the boot process and includes loading of an operating system from disk or some other storage media.

2. Typically one of the first operations during the boot process is the loading of the kernel and its components. This example provides the validation of kernel components and, if all are successfully validated as secure, the setting of a flag indicating the kernel is secure. This is shown in block 604.

3. After the computer system is considered fully operational a user may start an application such as a trusted media player which may require a protected environment. This example provides a secure kernel with an application operating in a protected environment, as shown in block 606.

4. Once the protected environment has been created and one or more of the processes of the application have been loaded into it and are operating, the trusted environment may periodically check the kernel secure flag to ensure the kernel remains secure, as shown in block 608. That is, from the point in time that the trusted application begins operation, a check may be made periodically to determine whether any unauthorized kernel components have been loaded. Such unauthorized kernel components could attack the trusted application or the data it may be processing. Therefore, if any such components are loaded, the kernel secure flag may be set appropriately.

Loading and Validating a Secure Kernel

Figure 7:
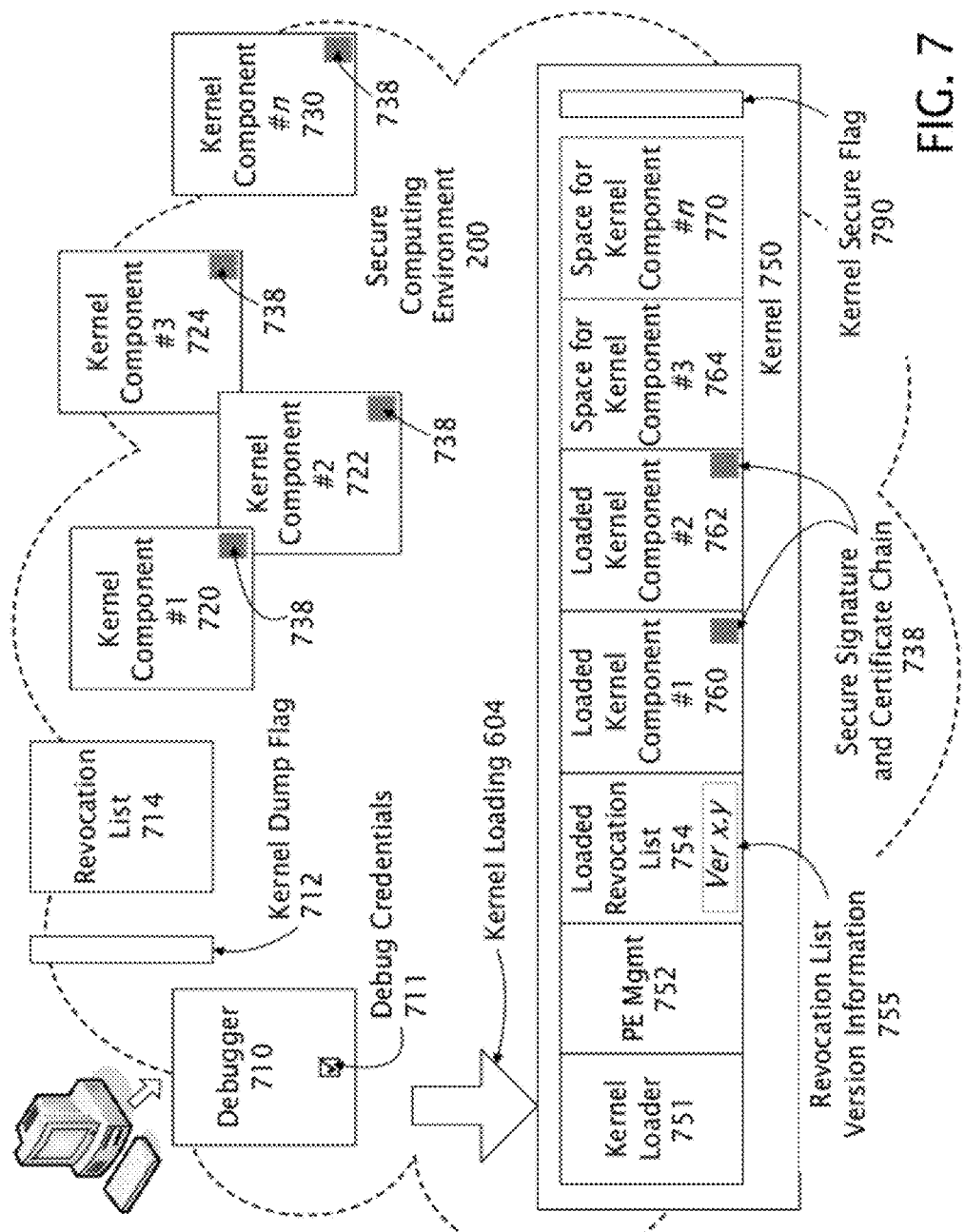
FIG. 7 is a block diagram showing exemplary kernel components and other components utilized for creating an exemplary secure computing environment.

FIG. 7 is a block diagram showing exemplary kernel components 720-730 and other components 710-714 utilized in creating an exemplary secure computing environment 200. This figure shows a computer system containing several components 710-730 typically stored on a disk or the like, several of which are used to form the kernel of an operating system when a computer is started. Arrow 604 indicates the process of loading the kernel components into memory forming the operational kernel of the system. The loaded kernel 750 is shown containing its various components 751-762 and a kernel secure flag 790 indicating whether or not the kernel is considered secure for a protected environment. The kernel secure flag 790 being described as a "flag" is not meant to be limiting; it may be implemented as a boolean variable or as a more complex data structure or mechanism.

Kernel components 720-730 are typically "signed" and may include a certificate data 738 that may allow the kernel to validate that they are the components they claim to be, that they have not been modified and/or are not malicious. A signature block and/or certificate data 738 may be present in each kernel component 720-730 and/or each loaded kernel component 760, 762. The signature and/or certificate data 738 may be unique to each component. The signature and/or certificate data 738 may be used in the creation and maintenance of protected environments as indicated below. Typically a component is "signed" by its provider in such as way as to securely identify the source of the component and/or indicate whether it may have been tampered with. A signature may be implemented as a hash of the component's header or by using other techniques. A conventional certificate or certificate chain may also be included with a component that may be used to determine if the component can be trusted. The signature and/or certificate data 738 are typically added to a component before it is distributed for public use. Those skilled in the art will be familiar with these technologies and their use.

When a typical computer system is started or "booted" the operating system's loading process or "kernel loader" 751 may typically load the components of the kernel from disk or the like into a portion of system memory to form the kernel of the operating system. Once all of the kernel components are loaded and operational the computer and operating system are considered "booted" and ready for normal operation.

Kernel component #1 720 thru kernel component #n 730, in the computing environment, may be stored on a disk or other storage media, along with a revocation list 714, a kernel dump flag 712 and a debugger 710 along with a debug credential 711. Arrow 604 indicates the kernel loading process which reads the various components 714-730 from their storage location and loads them into system memory forming a functional operating system kernel 750. The kernel dump flag 712 being described as a "flag" is not meant to be limiting; it may be implemented as a boolean variable or as a more complex data structure or mechanism.

The kernel loader 751 along with the PE management portion of the kernel 752, the revocation list 754 and two of the kernel components 720 and 722 are shown loaded into the kernel, the latter as blocks 760 and 762, along with an indication of space for additional kernel components yet to be loaded into the kernel, 764 and 770. Finally, the kernel 750 includes a kernel secure flag 790 which may be used to indicate whether or not the kernel 750 is currently considered secure or not. This illustration is provided as an example and is not intended to be limiting or complete. The kernel loader 751, the PE management portion of the kernel 752 and/or the other components of the kernel are shown as distinct kernel components for clarity of explanation but, in actual practice, may or may not be distinguishable from other portions of the kernel.

Included in the computing environment 200 may be a revocation list 714 that may be used in conjunction with the signature and certificate data 738 associated with the kernel components 760 and 762. This object 714 may retain a list of signatures, certificates and/or certificate chains that are no longer considered valid as of the creation date of the list 714. The revocation list 714 is shown loaded into the kernel as object 754. Such lists are maintained because a validly-signed and certified component, for example components 760 and 762, may later be discovered to have some problem. The system may use such a list 754 to check kernel components 720-730 as they are loaded, which may be properly signed and/or have trusted certificate data 738, but that may have subsequently been deemed untrustworthy. Such a revocation list 754 will typically include version information 755 so that it can more easily be identified, managed and updated as required.

Another component of the system that may impact kernel security is a debugger 710. Debuggers may not typically be considered a part of the kernel but may be present in a computing environment 200. Debuggers, including those known as kernel debuggers, system analyzers, and the like, may have broad access to the system and the processes running on the system along with any data. A debugger 710 may be able access any data in a computing environment 200, including media content that should not be accessed in a manner other than that authorized. On the other hand, debugging is typically a part of developing new functionality and it typically is possible to debug within protected environments the code intended to process protected media content. A debugger 710 may thus include debug credentials 711 which may indicate that the presence of the debugger 710 on a system is authorized. Thus detection of the presence of a debugger 710 along with any accompanying credentials 711 may be a part of the creation and maintenance of protected environments (FIG. 6, 600).

The computing environment 200 may include a kernel dump flag 712. This flag 712 may be used to indicate how much of kernel memory is available for inspection in case of a catastrophic system failure. Such kernel dumps may be used for postmortem debugging after such as failure. If such a flag 712 indicates that substantially all memory is available for inspection upon a dump then the kernel 750 may be considered insecure as hacker could run an application which exposes protected media in system memory and then force a catastrophic failure condition which may result in the memory being available for inspection including that containing the exposed media content. Thus a kernel dump flag 712 may be used in the creation and maintenance of a protected environments (FIG. 6, 600).

Figure 8:
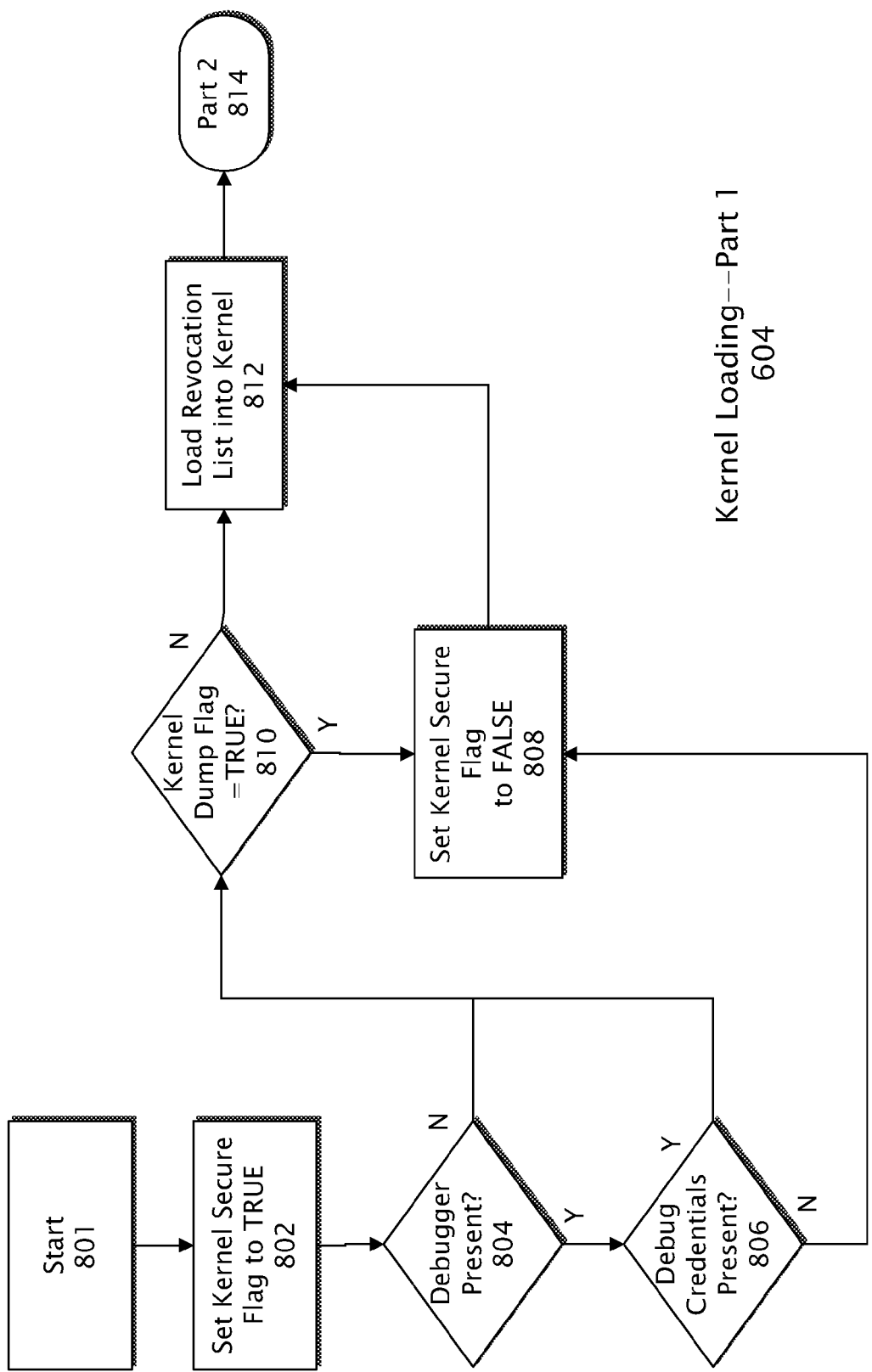
FIG. 8 and FIG. 9 are flow diagrams showing an exemplary process for loading kernel components to create an exemplary secure computing environment.
Figure 9:
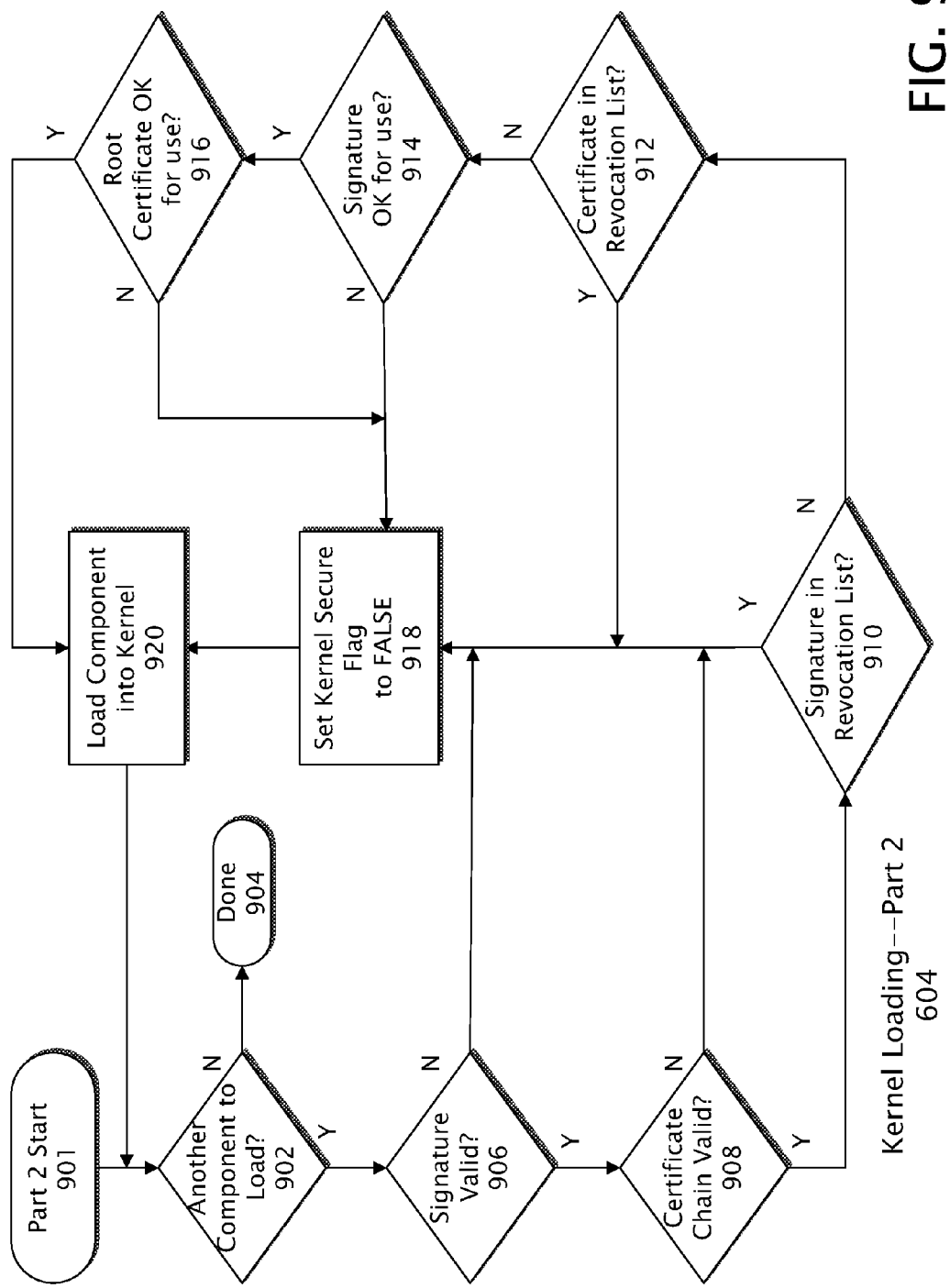

FIG. 8 and FIG. 9 are flow diagrams showing an exemplary process 604 for loading kernel components to create an exemplary secure computing environment. This process 604 begins after the kernel loader has been started and the PE management portion of the kernel has been loaded and made operational. Not shown in these figures, the PE management portion of the kernel may validate the kernel loader itself and/or any other kernel elements that may have been previously loaded. Validation may be defined as determining whether or not a given component is considered secure and trustworthy as illustrate in part 2 of this process 604.

The term "authorized for secure use" and the like as used below with respect to kernel components has the following specific meaning. A kernel containing any components that are not authorized for secure use does not provide a secure computing environment within which protected environments may operate. The opposite may not be true as it depends on other factors such as attack vectors.

1. Block 801 shows the start of the loading process 604 after the PE management portion of the kernel has been loaded and made operational. Any component loaded in the kernel prior to this may be validated as described above.

2. Block 802 shows that the kernel secure flag initially set to TRUE unless any component loaded prior to the PE management portion of the kernel, or that component itself, is found to be insecure at which point the kernel secure flag may be set to FALSE. In practice the indication of TRUE or FALSE may take various forms; the use of TRUE or FALSE here is only an example and is not meant to be limiting.

3. Block 804 indicates a check for the presence of a debugger in the computing environment. Alternatively a debugger could reside remotely and be attached to the computing environment via a network or other communications media to a process in the computing environment. If no debugger is detected the loading process 604 continues at block 810. Otherwise it continues at block 809. Not shown in the diagram, this check may be performed periodically and the state of the kernel secure flag updated accordingly.

4. If a debugger is detected, block 806 shows a check for debug credentials which may indicate that debugging may be authorized on the system in the presence of a protected environment. If such credentials are not present, the kernel secure flag may be set to FALSE as shown in block 808. Otherwise the loading process 604 continues at block 810.

5. Block 810 shows a check of the kernel dump flag. If this flag indicates that a full kernel memory dump or the like may be possible then the kernel secure flag may be set to FALSE as shown in block 808. Otherwise the loading process 604 continues at block 812. Not shown in the diagram, this check may be performed periodically and the state of the kernel secure flag updated accordingly.

6. Block 812 shows the loading of the revocation list into the kernel. In cases where the revocation list may be used to check debug credentials, or other previously loaded credentials, signatures, certificate data, or the like, this step may take place earlier in the sequence (prior to the loading of credentials and the like to be checked) than shown. Not shown in the diagram is that, once this component is loaded, any and all previously loaded kernel components may be checked to see if their signature and/or certificate data has been revoked per the revocation list. If any have been revoked, the kernel secure flag may be set to FALSE and the loading process 604 continues at block 814. Note that a revocation list may or may not be loaded into the kernel to be used in the creation and maintenance of a protected environments.

7. Block 814 shows the transition to part 2 of this diagram shown in FIG. 9 and continuing at block 901.

8. Block 902 shows a check for any additional kernel components to be loaded. If all components have been loaded then the load process 604 is usually complete and the kernel secure flag remains in whatever state it was last set to, either TRUE or FALSE. If there are additional kernel components to be loaded the load process 604 continues at block 906.

9. Block 906 shows a check for a valid signature of the next component to be loaded. If the signature is invalid then the kernel secure flag may be set to FALSE as shown in block 918. Otherwise the loading process 604 continues at block 908. If no component signature is available the component may be considered insecure and the kernel secure flag may be set to FALSE as shown in block 918. Signature validity may be determined by checking for a match on a list of valid signatures and/or by checking whether the signer's identity is a trusted identity. As familiar to those skilled in the security technology area, other methods could also be used to validate component signatures.

10. Block 908 shows a check of the component's certificate data. If the certificate data is invalid then the kernel secure flag may be set to FALSE as shown in block 918. Otherwise the loading process 604 continues at block 910. If no component certificate data is available the component may be considered insecure and the kernel secure flag may be set to FALSE as shown in block 918. Certificate data validity may be determined by checking the component's certificate data to see if the component is authorized for secure use. As familiar to those skilled in the art, other methods could also be used to validate component certificate data.

11. Block 910 shows a check of the component's signature against a revocation list loaded in the kernel. If the signature is present on the list, indicating that it has been revoked, then the kernel secure flag may be set to FALSE as shown in block 918. Otherwise the loading process 604 continues at block 912.

12. Block 912 shows a check of the component's certificate data against a revocation list. If the certificate data is present on the list, indicating that it has been revoked, then the kernel secure flag may be set to FALSE as shown in block 918. Otherwise the loading process 604 continues at block 914.

13. Block 914 shows a check of the component's signature to determine if it is OK for use. This check may be made by inspecting the component's leaf certificate data to see if the component is authorized for secure use. Certain attributes in the certificate data may indicate if the component is approved for protected environment usage. If not the component may not be appropriately signed and the kernel secure flag may be set to FALSE as shown in block 918. Otherwise the loading process 604 continues at block 916.

14. Block 916 shows a check of the component's root certificate data. This check may be made by inspecting the component's root certificate data to see if it is listed on a list of trusted root certificates. If not the component may be considered insecure and the kernel secure flag may be set to FALSE as shown in block 918. Otherwise the loading process 604 continues at block 920.

15. Block 920 shows the loading of the component into the kernel where it is now considered operational. Then the loading process 604 returns to block 902 to check for any further components to be loaded.

Creating Protected Environments

Figure 10:
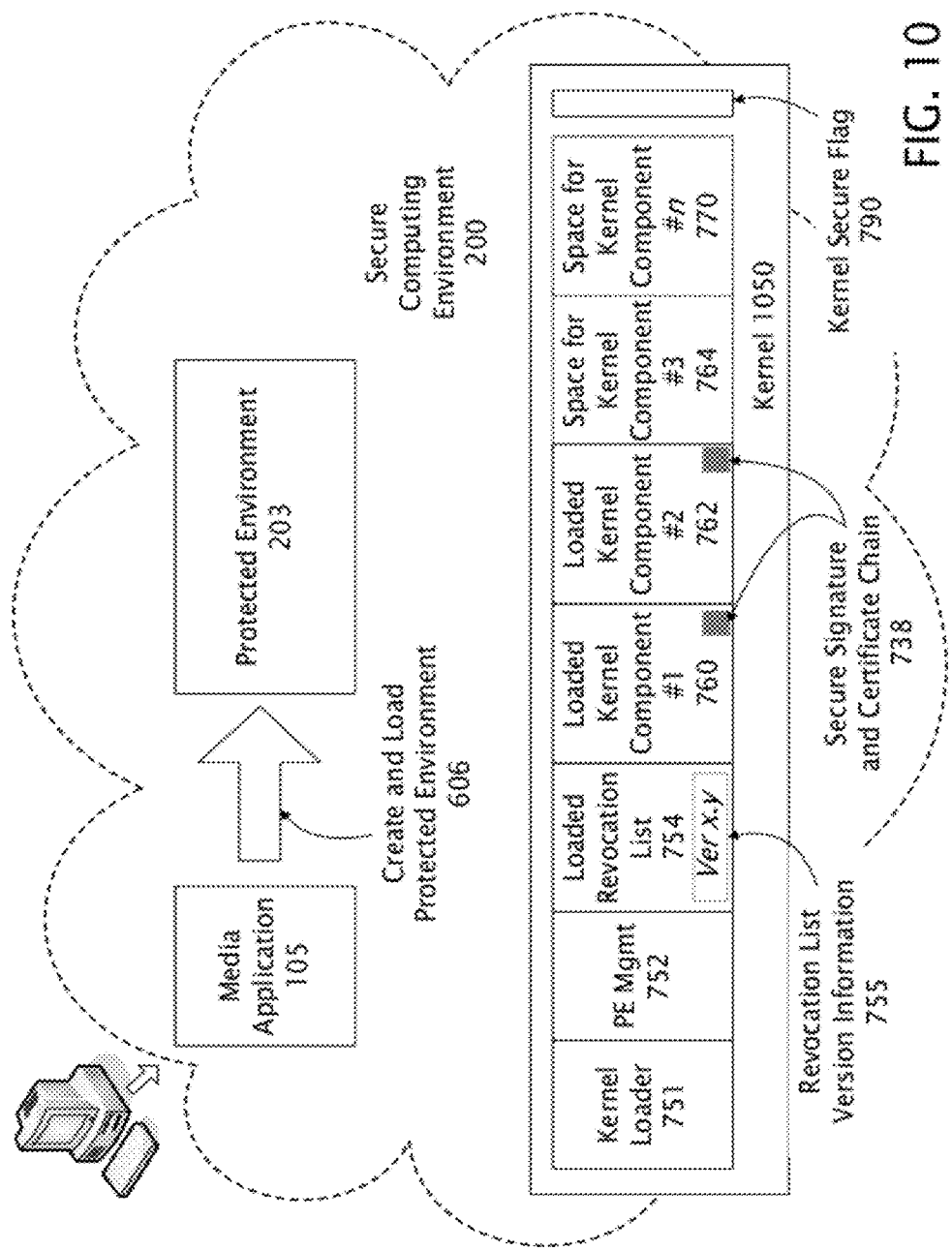
FIG. 10 is a block diagram showing a secure computing environment loading an application into an exemplary protected environment to form a trusted application that is typically resistant to attacks.

FIG. 10 is a block diagram showing a secure computing environment 200 loading an application 105 into an exemplary protected environment 203 to form a trusted application that is typically resistant to attacks. In this example the kernel may be the same as that described in FIG. 7, has already been loaded and the system 200 is considered fully operational. At this point, as an example, a user starts media application 105. The media application 105 may call for the creation of a protected environment 203 for one or more of its processes and/or components to operate within. The protected environment creation process 606 creates the protected environment 203 and loads the application 105 and/or its components as described below.

Figure 11:
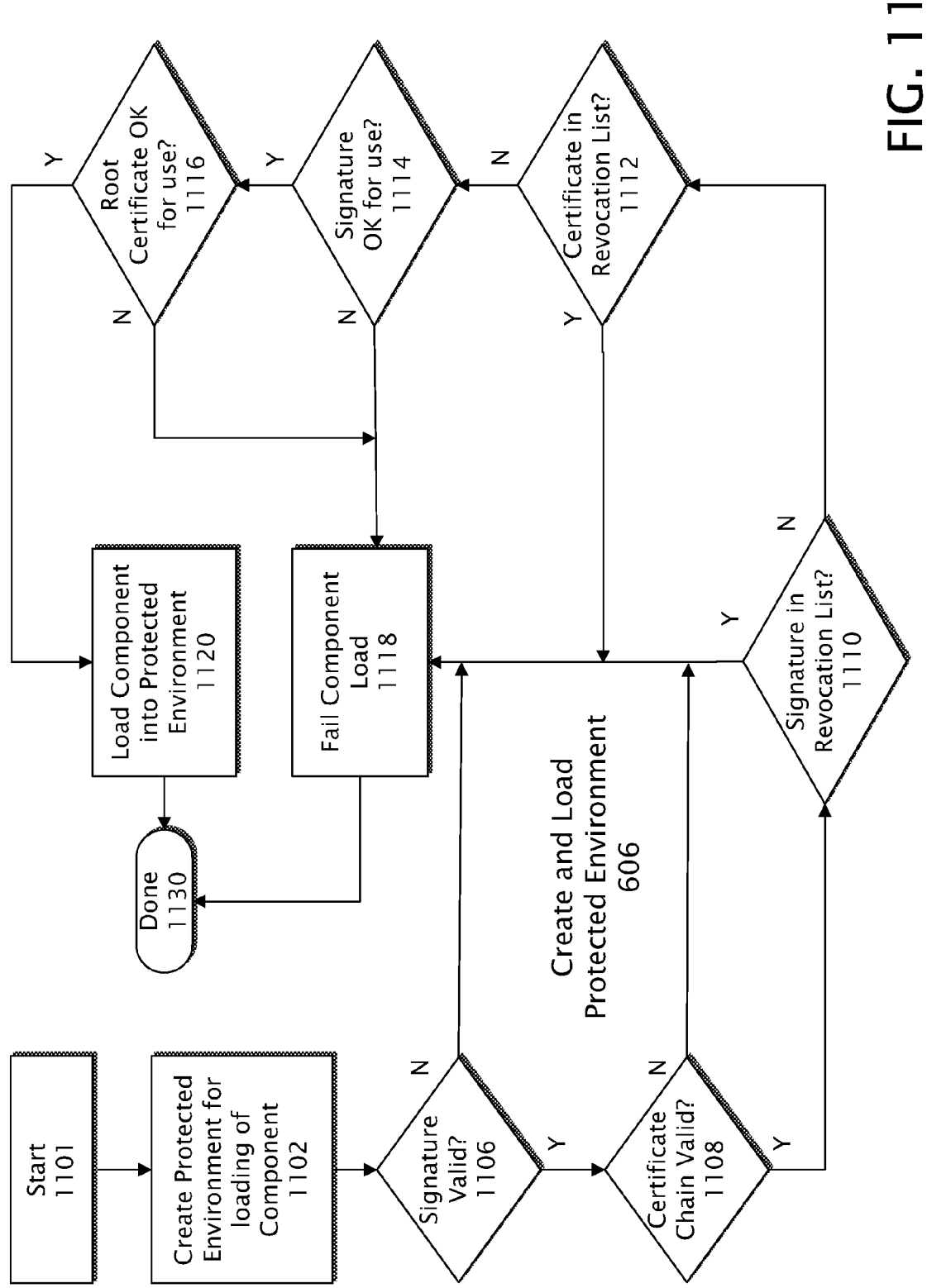
FIG. 11 is a flow diagram showing an exemplary process for creating a protected environment and loading an application into the protected environment.

FIG. 11 is a flow diagram showing an exemplary process 606 for creating a protected environment and loading an application into the protected environment. This process 606 includes the initial step of creating a secure process followed by validating the software component to be loaded into it and then loading the software component into the new secure process and making it operational. Upon success, the result may be a software component operating in a protected environment supported by a secure kernel. Such a software component, along with any digital media content or other data it processes, may be protected from various attacks, including those described above.

1. Block 1101 shows the start of the protected environment creation process 606. This point is usually reached when some application or code calls for a protected environment to operate.

2. Block 1102 shows the establishment of a protected environment. While not shown in the diagram, this may be accomplished by requesting the operating system to create a new secure process. Code later loaded and operating in this secure process may be considered to be operating in a protected environment. If the kernel secure flag is set to FALSE then the "create new secure process" request may fail. This may be because the system as a whole may be considered insecure and unsuitable for a protected environment and any application or data requiring a protected environment. Alternatively, the "create new secure process" request may succeed and the component loaded into the new process may be informed that the system is considered insecure so that it can modify its operations accordingly. Otherwise the process 606 continues at block 1106.

3. Block 1106 shows a check for a valid signature of the software component to be loaded into the new secure process or protected environment. If the signature is invalid then the process 606 may fail as shown in block 1118. Otherwise the process 606 continues at block 1108. Not shown in the process is that the program, or its equivalent, creating the new secure process may also be checked for a valid signature. Thus, for either the component itself and/or the program creating the new secure process, if no signature is available the component may be considered insecure and the process 606 may fail as shown in block 1118. Signature validity may be determined by checking for a match on a list of valid signatures and/or by checking whether the signer's identity is a trusted identity. As familiar to those skilled in the security technology area, other methods could also be used to validate component signatures.

4. Block 1108 shows a check of the software component's certificate data. If the certificate data is invalid then the process 606 may fail as shown in block 1118. Otherwise the process 606 continues at block 1110. If no component certificate data is available the component may be considered insecure and the process 606 may fail as shown in block 1118. Certificate data validity may be determined by checking the component's certificate data to see if the component is authorized for secure use. As familiar to those skilled in the art, other methods could also be used to validate component certificate data.

5. Block 1110 shows a check of the component's signature against a revocation list. If the signature is present on the list, indicating that it has been revoked, then the process 606 may fail as shown in block 1118. Otherwise the process 606 continues at block 1112.

12. Block 1112 shows a check of the component's certificate data against a revocation list. If the certificate data is present on the list, indicating that it has been revoked, then the process 606 may fail as shown in block 1118. Otherwise the process 606 continues at block 1114.

13. Block 1114 shows a check of the component's signature to determine if it is acceptable for use. This check may be made by inspecting the component's leaf certificate data to see if the component is authorized for secure use. Certain attributes in the certificate data may indicate if the component is approved for protected environment usage. If not the component may be considered to not be appropriately signed and the process 606 may fail as shown in block 1118. Otherwise the process 606 continues at block 1116.

14. Block 1116 shows a check of the component's root certificate data. This check may be made by inspecting the component's root certificate data to see if it is listed on a list of trusted root certificates. If not the component may be considered insecure and the process 606 may fail as shown in block 1118. Otherwise the process 606 continues at block 1120.

15. Block 1118 shows the failure of the software component to load followed by block 1130, the end of the protected environment creation process 606.

16. Block 1120 shows the software component being loaded into the protected environment, where it is considered operational, followed by block 1130, the end of the protected environment creation process 606.

Validating a Secure Kernel Over Time

Figure 12:
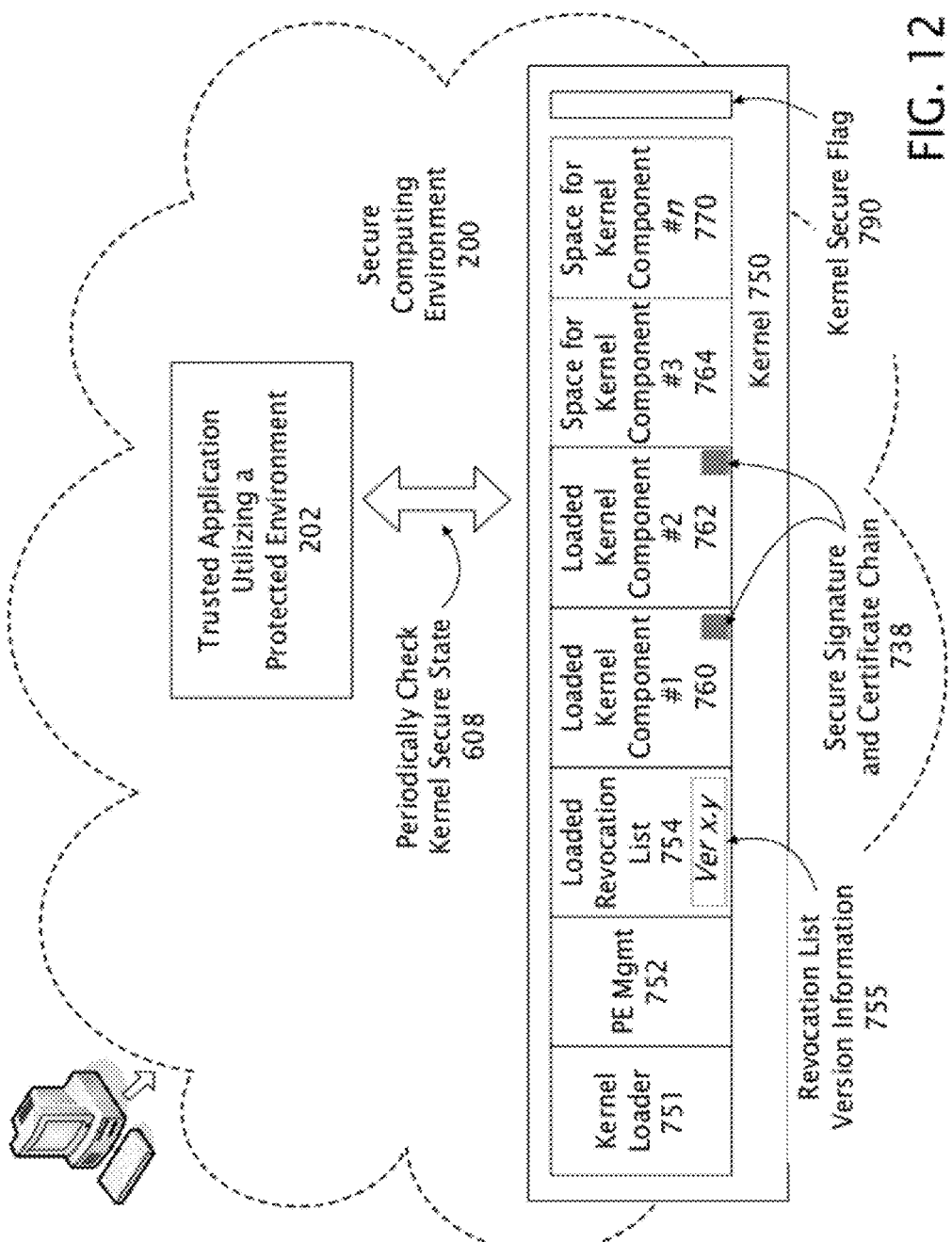
FIG. 12 is a block diagram showing an exemplary trusted application utilizing an exemplary protected environment periodically checking the security state of the secure computing environment.

FIG. 12 is a block diagram showing an exemplary trusted application utilizing an exemplary protected environment 202 periodically checking 608 the security state 790 of the secure computing environment 200. In this example, the computing environment 200 and the kernel 750 may be the same as those described in FIGS. 7 and 8. The kernel 750 has already been loaded and the computer 200 is considered fully operational. Further, a protected environment has been created and the appropriate components of the trusted application have been loaded into it and made operational, establishing a trusted application utilizing a protected environment 202, hereafter referred to simply as the "protected environment".

The protected environment 202 may periodically check with the PE management portion of the kernel 752 to determine whether the kernel 750 remains secure over time. This periodic check may be performed because it is possible for a new component to be loaded into the kernel 750 at any time, including a component that may be considered insecure. If this were to occur, the state of the kernel secure flag 790 would change to FALSE and the code operating in the protected environment 202 has the opportunity to respond appropriately.

For example, consider a media player application that was started on a PC 200 with a secure kernel 750 and a portion of the media player application operating in a protected environment 202 processing digital media content that is licensed only for secure use. In this example, if a new kernel component that is considered insecure is loaded while the media player application is processing the media content, then the check kernel secure state process 240 would note the kernel secure flag 790 has changed to FALSE indicating the kernel 750 may no longer be secure.

Alternatively, the revocation list 745 may be updated and a kernel component previously considered secure may no longer be considered secure, resulting in the kernel secure flag 790 being set to FALSE. At this point the application may receive notification that the system 200 is no longer considered secure and can terminate operation, or take other appropriate action to protect itself and/or the media content it is processing.

Figure 13:
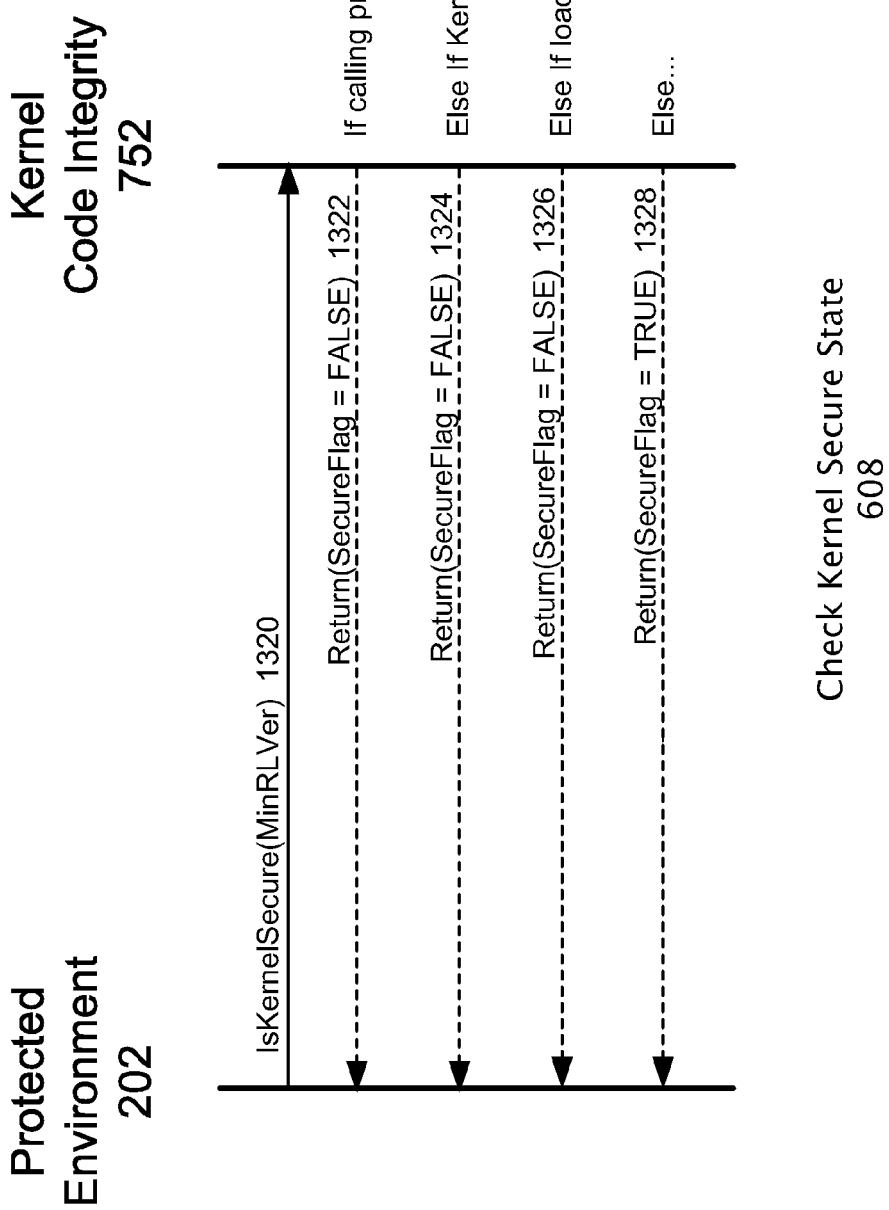
FIG. 13 is a flow diagram showing an exemplary process for periodically checking the security state of the secure computing environment.

FIG. 13 is a flow diagram showing an exemplary process 608 for periodically checking the security state of the secure computing environment. This process 608 may be used by a protected environment 202 to determine if the kernel remains secure over time. The protected environment 202 may periodically use this process 608 to check the current security status of the kernel. The protected environment 202 and/or the software component operating within it may use the current security status information to modify its operation appropriately. Periodic activation of the process may be implemented using conventional techniques.

The diagram shows a sequence of communications 608, illustrated with exemplary pseudo code, between the protected environment 202 and the PE management portion of the kernel 752. This communication may include a check of the version of a revocation list which may give an application the ability to specify a revocation list of at least a certain version. This communications sequence may be cryptographically secured using conventional techniques.

1. The protected environment 202 makes a IsKernelSecure (MinRLVer) call 1320 to the PE management portion of the kernel to query the current security state of the kernel. Included in this call 1320 may be the minimum version (MinRLVer) of the revocation list expected to be utilized.

2. The PE management portion of the kernel checks to see if the protected environment, which is the calling process, is secure. If not, then it may provide a Return (SecureFlag=FALSE) indication 1322 to the protected environment and the communications sequence 608 is complete. This security check may be done by the PE management portion of the kernel checking the protected environment for a valid signature and/or certificate data as described above.

3. Otherwise, the PE management portion of the kernel checks the kernel secure flag in response to the call 1320. If the state of the flag is FALSE then it may provide a Return (SecureFlag=FALSE) indication 1324 to the protected environment and the communications sequence 608 is complete.

4. Otherwise, the PE management portion of the kernel checks the revocation list version information for the revocation list. If the revocation list has version information that is older than that requested in the IsKernelSecure(MinRLVer) call 1320 then several options are possible. First, as indicated in the diagram, the PE management portion of the kernel may provide a Return(SecureFlag=FALSE) indication 1326 to the protected environment and the communications sequence 608 is complete.

Alternatively, and not shown in the diagram, an appropriate version revocation list may be located and loaded into the kernel, all kernel components could be re-validated using this new or updated list, the kernel secure flag updated as appropriate and the previous step #3 of this communications sequence 608 repeated.

5. Otherwise, the PE management portion of the kernel may provide a Return(SecureFlag=TRUE) indication 1328 to the protected environment and the communications sequence 608 is complete.

Exemplary Computing Environment

Figure 14:
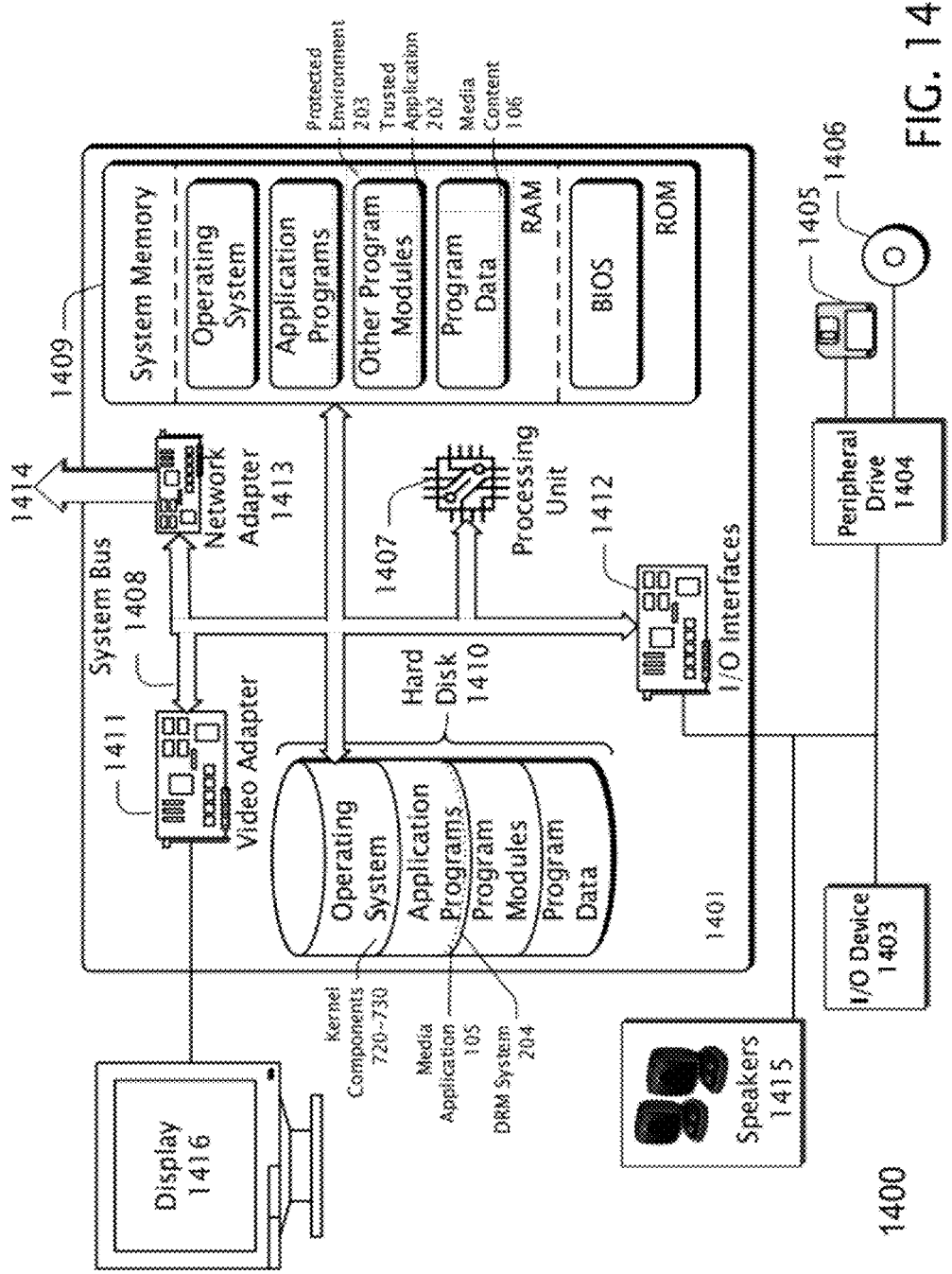
FIG. 14 is a block diagram showing an exemplary computing environment in which the processes, systems and methods for establishing a secure computing environment including a protected environment may be implemented.

FIG. 14 is a block diagram showing an exemplary computing environment 1400 in which the processes, systems and methods for establishing a secure computing environment including a protected environment 203 may be implemented. Exemplary personal computer 1400 is only one example of a computing system or device that may provide secure computing environment and/or a protected environment and is not intended to limit the examples described in this application to this particular computing environment or device type.

A suitable computing environment can be implemented with numerous other general purpose or special purpose systems. Examples of well known systems may include, but are not limited to, personal computers ("PC") 1400, hand-held or laptop devices, microprocessor-based systems, multiprocessor systems, set top boxes, programmable consumer electronics, gaming consoles, consumer electronic devices, cellular telephones, PDAs, and the like.

The PC 1400 includes a general-purpose computing system in the form of a computing device 1401 couple to various peripheral devices 1403, 1404, 1415, 1416 and the like. The components of computing device 1401 may include one or more processors (including CPUs, GPUs, microprocessors and the like) 1407, a system memory 1409, and a system bus 1408 that couples the various system components. Processor 1407 processes various computer executable instructions to control the operation of computing device 1401 and to communicate with other electronic and/or computing devices (not shown) via various communications connections such as a network connection 1414 an the like. The system bus 1408 represents any number of several types of bus structures, including a memory bus or memory controller, a peripheral bus, an accelerated graphics port, and/or a processor or local bus using any of a variety of bus architectures.

The system memory 1409 may include computer readable media in the form of volatile memory, such as random access memory (RAM), and/or non-volatile memory, such as read only memory (ROM). A basic input/output system (BIOS) may be stored in ROM. RAM typically contains data and/or program modules that are immediately accessible to and/or presently operated on by one or more of the processors 1407. By way of example, shown loaded in system memory for operation is a trusted application 202 utilizing a protected environment 203 and the media content being processed 106.

Mass storage devices 1404 and 1410 may be coupled to the computing device 1401 or incorporated into the computing device 1401 by coupling to the system bus. Such mass storage devices 1404 and 1410 may include a magnetic disk drive which reads from and writes to a removable, non volatile magnetic disk (e.g., a "floppy disk") 1405, and/or an optical disk drive that reads from and/or writes to a non-volatile optical disk such as a CD ROM, DVD ROM or the like 1406. Computer readable media 1405 and 1406 typically embody computer readable instructions, data structures, program modules and the like supplied on floppy disks, CDs, DVDs, portable memory sticks and the like.

Any number of program programs or modules may be stored on the hard disk 1410, other mass storage devices 1404, and system memory 1409 (typically limited by available space) including, by way of example, an operating system(s), one or more application programs, other program modules, and/or program data. Each of such operating system, application program, other program modules and program data (or some combination thereof) may include an embodiment of the systems and methods described herein. Kernel components 720-730 may be stored on the disk 1410 along with other operating system code. Media application 105 and/or a digital rights management system 204 may be stored on the disk 1410 along with other application programs. These components 720-730 and applications 105, 204 may be loaded into system memory 1409 and made operational.

A display device 1416 may be coupled to the system bus 1408 via an interface, such as a video adapter 1411. A user can interface with computing device 1400 via any number of different input devices 1403 such as a keyboard, pointing device, joystick, game pad, serial port, and/or the like. These and other input devices may be coupled to the processors 1407 via input/output interfaces 1412 that may be coupled to the system bus 1408, and may be coupled by other interface and bus structures, such as a parallel port(s), game port(s), and/or a universal serial bus (USB) and the like.

Computing device 1400 may operate in a networked environment using communications connections to one or more remote computers and/or devices through one or more local area networks (LANs), wide area networks (WANs), the Internet, radio links, optical links and the like. The computing device 1400 may be coupled to a network via a network adapter 1413 or alternatively via a modem, DSL, ISDN interface or the like.

Communications connection 1414 is an example of communications media. Communications media typically embody computer readable instructions, data structures, program modules and/or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media include wired media such as a wired network or direct-wired connection, and wireless media such as acoustic, radio frequency, infrared, and other wireless media.

Those skilled in the art will realize that storage devices utilized to store computer-readable program instructions can be distributed across a network. For example a remote computer or device may store an example of the system described as software. A local or terminal computer or device may access the remote computer(s) or device(s) and download a part or all of the software to run a program(s). Alternatively the local computer may download pieces of the software as needed, or distributively process the software by executing some of the software instructions at the local terminal and some at remote computers and/or devices.

Those skilled in the art will also realize that by utilizing conventional techniques known to those skilled in the art that all, or a portion, of the software instructions may be carried out by a dedicated electronic circuit such as a digital signal processor ("DSP"), programmable logic array ("PLA"), discrete circuits, or the like. The term electronic apparatus as used herein includes computing devices and consumer electronic devices comprising any software and/or firmware and the like, and/or electronic devices or circuits comprising no software and/or firmware and the like.

The term computer readable medium may include system memory, hard disks, mass storage devices and their associated media, communications media, and the like.

The invention claimed is:

1. A method of loading a plurality of kernel components to create a secure computing environment within a computing device, the method comprising:

loading, by a kernel loader of the plurality of kernel components of a kernel of an operating system of the computing device, a protected environment ("PE") management component into the kernel, where the loaded PE management component is operational on the computing device, where the PE management component is one of the plurality of kernel components, and where the kernel loader is operational on the computing device;

validating, by the loaded and operational PE management component, that the operational kernel loader is secure, the validating based on a valid signature of the operational kernel loader;

determining that a debugger is coupled to the computing device; and determining that a debug credential that corresponds to the debugger indicates that debugging via the debugger is authorized on the computing device with the secure computing environment.

2. The method of claim 1, further comprising setting, based on the debug credential, a kernel secure flag.

3. The method of claim 1, further comprising:

loading a revocation list into the kernel of the operating system;

determining that there is another component of the plurality of kernel components to load into the kernel;

validating a signature of the another component;

verifying that a certificate of the another component is valid;

determining that the signature is not on the loaded revocation list; and determining that the certificate in not on the loaded revocation list.

4. The method of claim 3, further comprising:

determining that the signature is acceptable for use;

determining that the certificate is acceptable for use; and loading, in response to the determinings, the validating, and the verifying, the another component into the kernel.

5. A computer comprising:

a memory;

an operating system including a kernel that includes a plurality of kernel components;

a kernel loader configured for loading a protected environment ("PE") management component into the kernel, where the kernel loader and the PE management component are each being one of the plurality of kernel components;

the protected environment ("PE") management component configured for validating that the kernel loader is secure based on a valid signature of the operational kernel loader; and a kernel secure flag maintained in the kernel and configured to indicate, in response to the validating, that the computer is allowed to load a trusted application into the memory, and where the kernel secure flag is further configured to indicate, in response to the validating, that the computer is not allowed to load the trusted application into the memory.

6. The system of claim 5 further comprising a revocation list.

7. At least one storage device that is not a signal per se, the at least one storage device storing computer-executable instruction that, when executed by a computer, cause the computer to perform a method of loading a plurality of kernel components to create a protected environment ("PE"), the method comprising:

loading, by a kernel loader of the plurality of kernel components of a kernel of an operating system of the computer, a PE management component into the kernel, where the loaded PE management component is operational on the computer, where the PE management component is one of the plurality of kernel components, and where the kernel loader is operational on the computer;

validating, by the loaded and operational PE management component, that the operational kernel loader is secure based on a valid signature of the operational kernel loader;

determining that a debugger is coupled to the computer; and determining that a debug credential that corresponds to the debugger indicates that debugging via the debugger is authorized on the computer computing device with the protected environment.

8. The at least one storage device of claim 7, the method further comprising setting, based on the debug credential, the kernel secure flag.

9. The at least one storage device of claim 7, the method further comprising:

loading a revocation list into the kernel;

determining that there is another component to load into the kernel;

validating a signature of the another component of the plurality of kernel components;

verifying that a certificate associated with the component is valid;

determining that the signature is not on the loaded revocation list; and determining that the certificate in not on the loaded revocation list.

10. The at least one storage device of claim 9, the method further comprising:

determining that the signature is acceptable for use;

determining that the certificate is acceptable for use; and loading, in response to the determinings, the validating, and the verifying, the loaded component into the kernel.

* * * * *